(12) United States Patent
Van Davelaar

(10) Patent No.: US 11,166,587 B2
(45) Date of Patent: Nov. 9, 2021

(54) DEVICE AND METHOD FOR DELIVERING LIQUID HEATED TO A DESIRED TEMPERATURE UNDER PRESSURE IN A MICROWAVE OVEN

(71) Applicant: Peter C. Van Davelaar, Norfolk, VA (US)

(72) Inventor: Peter C. Van Davelaar, Norfolk, VA (US)

( * ) Notice: Subject to any disclaimer, the term of this patent is extended or adjusted under 35 U.S.C. 154(b) by 244 days.

(21) Appl. No.: 16/460,452

(22) Filed: Jul. 2, 2019

(65) Prior Publication Data

US 2020/0015621 A1 Jan. 16, 2020

Related U.S. Application Data

(60) Provisional application No. 62/697,090, filed on Jul. 12, 2018.

(51) Int. Cl.
*A47J 31/54* (2006.01)
*A47J 31/40* (2006.01)
(Continued)

(52) U.S. Cl.
CPC ............. *A47J 31/547* (2013.01); *A23F 5/262* (2013.01); *A47J 31/3695* (2013.01);
(Continued)

(58) Field of Classification Search
CPC ..... A23F 5/262; A47J 31/3695; A47J 31/407; A47J 31/547; A47J 36/027; A47J 27/05;
(Continued)

(56) References Cited

U.S. PATENT DOCUMENTS 2,601,067 A * 6/1952 Spencer ................ A47J 31/043
99/292
4,104,957 A 8/1978 Freedman et al.
(Continued)

FOREIGN PATENT DOCUMENTS

EP 1060701 A1 12/2000
WO 03017811 A1 3/2003

OTHER PUBLICATIONS

International Search Report and Written Opinion for PCT Appl. No. PCT/US2019/040482, dated Sep. 20, 2019, 17 pages.

*Primary Examiner* — Drew E Becker
*Assistant Examiner* — Austin Parker Taylor
(74) *Attorney, Agent, or Firm* — Patent Law of Virginia, PLLC; Brian J. Teague

(57) ABSTRACT

A device for delivering a liquid heated to a desired temperature under pressure in a microwave oven comprises a first chamber adapted to receive and hold a first volume of a liquid, a second chamber adapted to receive and hold a second volume of the liquid, a vapor flow path from the first chamber to the second chamber, and a liquid/vapor flow path from the second chamber to a destination outside of the second chamber. When the liquid in the first chamber reaches its boiling point and at least partially turns into a gas, at least a portion of the gas flows through the vapor flow path from the first chamber into the second chamber, thereby increasing a pressure in the second chamber. The increased pressure in the second chamber forces the liquid in the second chamber through the liquid/vapor flow path and out of the second chamber.

24 Claims, 16 Drawing Sheets

(51) Int. Cl.
*H05B 6/80* (2006.01)
*A23F 5/26* (2006.01)
*B65D 85/804* (2006.01)
*A47J 36/02* (2006.01)
*A47J 31/36* (2006.01)

(52) U.S. Cl.
CPC ............ *A47J 31/407* (2013.01); *A47J 36/027* (2013.01); *B65D 85/8043* (2013.01); *H05B 6/802* (2013.01)

(58) Field of Classification Search
CPC ........ A47J 27/13; A47J 31/02; A47J 31/0576; A47J 31/0642–0689; A47J 31/4407; A47J 31/4446; A47J 31/54; B65D 81/3216; B65D 81/3453; B65D 85/816; B65D 85/8043–8055; B65D 2581/3409; H05B 6/802; H05B 6/804; A23L 5/30–34
USPC ............................ 426/115, 394; 99/295, 316
See application file for complete search history.

(56) References Cited

U.S. PATENT DOCUMENTS

| | | |
|---|---|---|
| 4,233,325 A | 11/1980 | Slangan et al. |
| 4,381,696 A * | 5/1983 | Koral .................... A47J 31/547 |
| | | 219/689 |
| 4,386,109 A | 5/1983 | Bowen et al. |
| 4,721,835 A | 1/1988 | Welker |
| 4,756,915 A | 7/1988 | Dobry |
| 5,049,713 A | 9/1991 | Creyaufmuller |
| 5,079,396 A | 1/1992 | Katz et al. |
| 5,325,765 A | 7/1994 | Sylvan et al. |
| 5,747,782 A * | 5/1998 | Orrico ...................... A23F 5/26 |
| | | 219/689 |
| 5,884,551 A | 3/1999 | Orrico et al. |
| 5,942,143 A | 8/1999 | Hartman et al. |
| 6,026,732 A | 2/2000 | Kollep et al. |
| 6,079,315 A | 6/2000 | Beaulieu et al. |
| 6,142,063 A | 11/2000 | Beaulieu et al. |
| 6,606,938 B2 | 8/2003 | Taylor |
| 6,655,260 B2 | 12/2003 | Lazaris |
| 7,165,488 B2 | 1/2007 | Bragg et al. |
| 7,217,908 B2 | 5/2007 | Orrico et al. |
| 7,387,063 B2 | 6/2008 | Vu et al. |
| 7,569,240 B2 | 8/2009 | Brizio |
| 8,495,949 B2 | 7/2013 | Tinkler et al. |
| 2004/0188428 A1 | 9/2004 | Policappelli |
| 2005/0204925 A1 | 9/2005 | Orrico et al. |
| 2008/0121110 A1 | 5/2008 | Lee |
| 2014/0182458 A1 | 7/2014 | Fernandez |

* cited by examiner

SECTION E-E

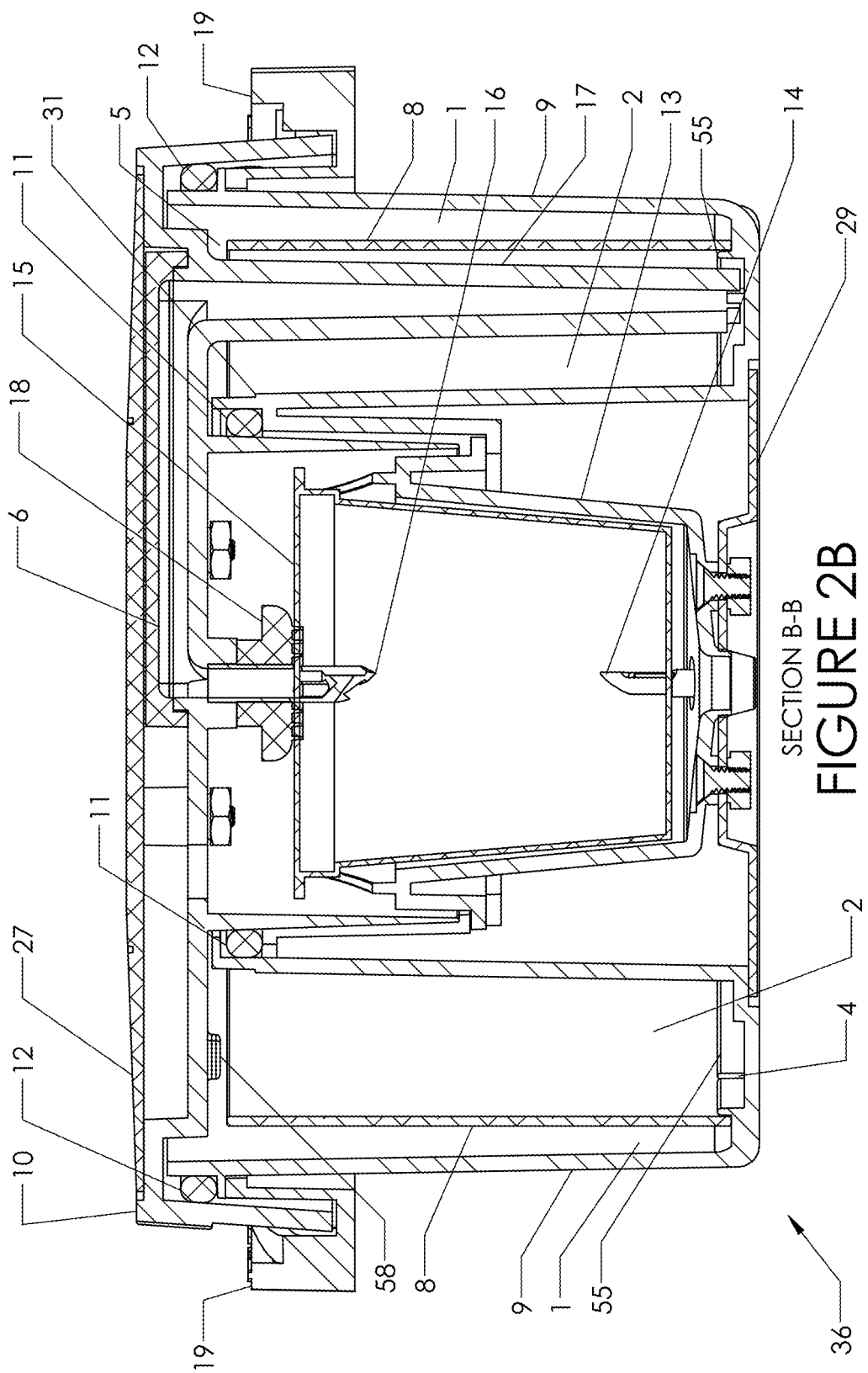

SECTION G-G

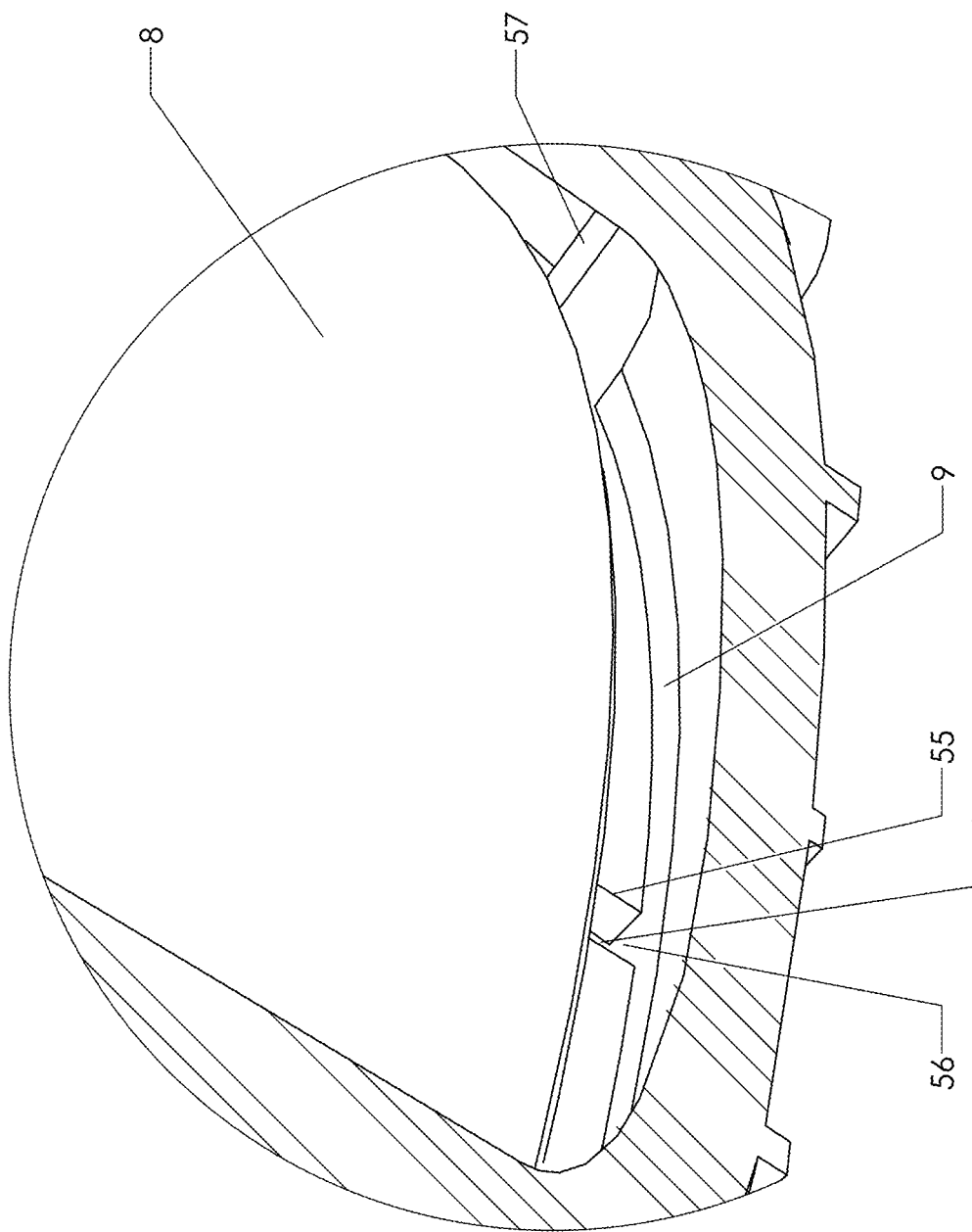

SECTION C-C

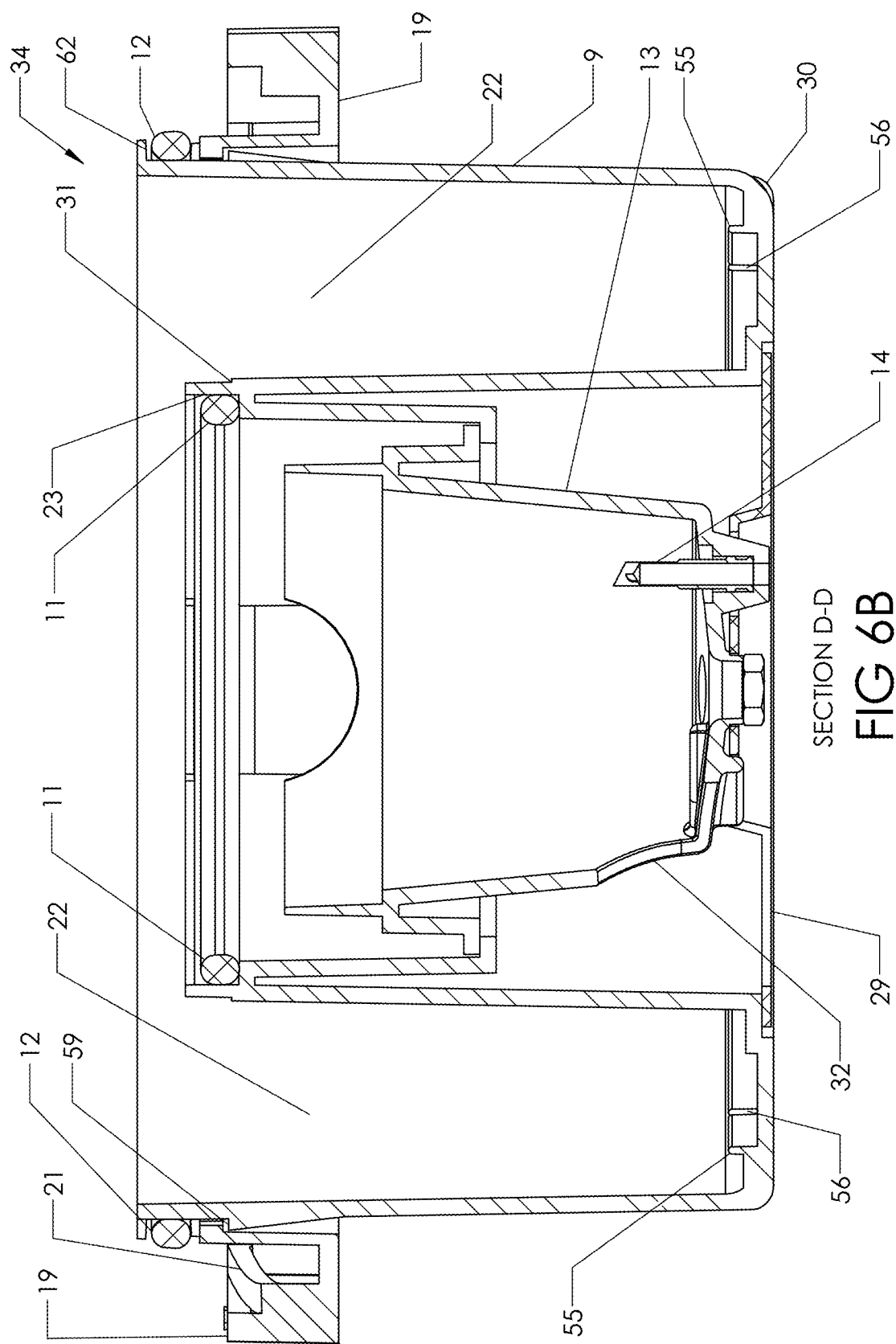

SECTION F-F

DEVICE AND METHOD FOR DELIVERING LIQUID HEATED TO A DESIRED TEMPERATURE UNDER PRESSURE IN A MICROWAVE OVEN

CROSS-REFERENCE TO RELATED APPLICATIONS

This application claims priority to U.S. Provisional Application Ser. No. 62/697,090, filed Jul. 12, 2018, the contents of which are incorporated herein by reference in its entirety.

FIELD OF THE INVENTION

The present invention relates to devices and methods for delivering liquid heated to a desired temperature under pressure in a microwave oven.

BACKGROUND

Food and drink preparation sometimes requires the delivery of water or other liquid in a specific temperature range. Dedicated beverage brewing machines are capable of the delivery of water or other liquid in a specific temperature range using integral electric heating elements. It may be desirable to prepare brewed beverages when a dedicated beverage brewing machine is not available, but a conventional microwave oven is available. What is needed is a device that can deliver liquid under pressure heated to a desired temperature using a conventional microwave oven in order to prepare a brewed beverage (or for other purposes).

BRIEF SUMMARY OF THE DISCLOSURE

A device for delivering a liquid heated to a desired temperature under pressure in a microwave oven comprises a first chamber adapted to receive and hold a first volume of a liquid, a second chamber adapted to receive and hold a second volume of the liquid, a vapor flow path from the first chamber to the second chamber, and a liquid/vapor flow path from the second chamber to a destination outside of the second chamber. The first chamber is configured such that the liquid in the first chamber receives a first amount of microwave energy produced by a microwave oven during a period of time. The second chamber is configured such that the liquid in the second chamber receives a second amount of microwave energy produced by a microwave oven during the period of time. A ratio of the second amount of microwave energy to a mass of the second volume of liquid is less than a ratio of the first amount of microwave energy to a mass of the first volume of liquid. When the liquid in the first chamber reaches its boiling point from receiving the first amount of microwave energy and at least partially turns into a gas, at least a portion of the gas flows through the vapor flow path from the first chamber into the second chamber, thereby increasing a pressure in the second chamber. The increased pressure in the second chamber forces at least a portion of the liquid in the second chamber through the liquid/vapor flow path from the second chamber to the destination outside of the second chamber.

A first chamber end of the vapor flow path may be above a predetermined liquid fill line. A second chamber end of the liquid/vapor flow path may be below the predetermined liquid fill line. The second chamber end of the liquid/vapor flow path may be in a bottom one-fourth of the second chamber.

The device may further comprise a liquid flow path between the first and second chambers such that the liquid is able to flow between the first and second chambers.

The first and second chambers may be formed from a larger chamber with a dividing wall separating the larger chamber into the first and second chambers. The dividing wall may be arranged such that the first chamber peripherally surrounds the second chamber.

The device may further comprise a nucleation site on an internal surface of the first chamber.

The device may further comprise a chamber adapted to receive and hold an infusible material, such that the liquid/vapor flow path delivers the liquid to the infusible material chamber.

The device may further comprise a chamber adapted to receive and hold a cartridge containing an infusible material, such that the liquid/vapor flow path delivers the liquid to the infusible material cartridge chamber. The device may further comprise a liquid insertion needle at a distal end of the liquid/vapor flow path, such that the liquid insertion needle is adapted to pierce a lid of the cartridge such that the liquid is delivered into the cartridge. The infusible material chamber may comprise an extraction needle adapted to pierce a bottom surface and/or a side surface of the cartridge such that the liquid delivered into the cartridge flows out of the cartridge through the extraction needle as a brewed beverage.

The device does not comprise an electric heating element.

In alternative embodiments of the invention, a method of delivering a liquid heated to a desired temperature under pressure in a microwave oven comprises: (1) obtaining a device having (a) a first chamber adapted to receive and hold a first volume of a liquid, (b) a second chamber adapted to receive and hold a second volume of the liquid, (c) a vapor flow path from the first chamber to the second chamber, and (d) a liquid/vapor flow path from the second chamber to a destination outside of the second chamber, wherein the first chamber is configured such that the liquid in the first chamber receives a first amount of microwave energy produced by a microwave oven during a period of time, wherein the second chamber is configured such that the liquid in the second chamber receives a second amount of microwave energy produced by a microwave oven during the period of time, and wherein a ratio of the second amount of microwave energy to a mass of the second volume of liquid is less than a ratio of the first amount of microwave energy to a mass of the first volume of liquid; (2) inserting the first volume of the liquid into the first chamber and the second volume of the liquid into the second chamber; (3) placing the device on top of a receiving vessel; (4) placing the device and the receiving vessel into a microwave oven; and (5) activating the microwave oven until the liquid in the first chamber reaches its boiling point and at least partially turns into gas. At least a portion of the gas flows through the vapor flow path from the first chamber into the second chamber thereby increasing a pressure in the second chamber. The increased pressure in the second chamber forces at least a portion of the liquid in the second chamber through the liquid/vapor flow path from the second chamber to the destination outside of the second chamber.

The device may further comprise a chamber adapted to receive and hold an infusible material, such that the liquid/vapor flow path delivers the liquid to the infusible material chamber. The method may further comprise placing the infusible material into the infusible material chamber prior to activating the microwave.

The device may further comprise a chamber adapted to receive and hold a cartridge containing an infusible material, such that the liquid/vapor flow path delivers the liquid to the infusible material cartridge chamber. The method may further comprise placing the cartridge containing the infusible material into the infusible material cartridge chamber prior to activating the microwave.

In alternative embodiments of the invention, a device for brewing a beverage in a microwave oven comprises a first chamber adapted to receive and hold a first volume of a liquid, a second chamber adapted to receive and hold a second volume of the liquid, a vapor flow path from the first chamber to the second chamber, a chamber adapted to receive and hold a cartridge containing an infusible material, and a liquid/vapor flow path from the second chamber to the infusible material chamber, wherein the liquid/vapor flow path has a liquid insertion nozzle at its distal end. The first chamber is configured such that the liquid in the first chamber receives a first amount of microwave energy produced by a microwave oven during a period of time. The second chamber is configured such that the liquid in the second chamber receives a second amount of microwave energy produced by a microwave oven during the period of time. A ratio of the second amount of microwave energy to a mass of the second volume of liquid is less than a ratio of the first amount of microwave energy to a mass of the first volume of liquid. When the liquid in the first chamber reaches its boiling point from receiving the first amount of microwave energy and at least partially turns into a gas, at least a portion of the gas flows through the vapor flow path from the first chamber into the second chamber, thereby increasing a pressure in the second chamber. The increased pressure in the second chamber forces at least a portion of the liquid in the second chamber through the liquid/vapor flow path and the liquid insertion nozzle and into the cartridge. The liquid delivered into the cartridge flows through the infusible material and out of the cartridge as a brewed beverage.

In alternative embodiments of the invention, a method of delivering a liquid heated to a desired temperature under pressure in a microwave oven comprises: (1) obtaining a device having (a) a first chamber adapted to receive and hold a first volume of a liquid, (b) a second chamber adapted to receive and hold a second volume of the liquid, (c) a vapor flow path from the first chamber to the second chamber, (d) a chamber adapted to receive and hold a cartridge containing an infusible material, and (e) a liquid/vapor flow path from the second chamber to the infusible material chamber, the liquid/vapor flow path having a liquid insertion nozzle at its distal end, wherein the first chamber is configured such that the liquid in the first chamber receives a first amount of microwave energy produced by a microwave oven during a period of time, wherein the second chamber is configured such that the liquid in the second chamber receives a second amount of microwave energy produced by a microwave oven during the period of time, and wherein a ratio of the second amount of microwave energy to a mass of the second volume of liquid is less than a ratio of the first amount of microwave energy to a mass of the first volume of liquid; (2) inserting the first volume of the liquid into the first chamber and the second volume of the liquid into the second chamber; (3) inserting the cartridge into the infusible material chamber; (4) placing the device on top of a receiving vessel; (5) placing the device and the receiving vessel into the microwave oven; and (6) activating the microwave oven until the liquid in the first chamber reaches its boiling point and at least partially turns into a gas. At least a portion of the gas flows through the vapor flow path from the first chamber into the second chamber thereby increasing a pressure in the second chamber. The increased pressure in the second chamber forces at least a portion of the liquid in the second chamber through the liquid/vapor flow path and the liquid insertion nozzle and into the cartridge. The liquid delivered into the cartridge flows through the infusible material and out of the cartridge as a brewed beverage.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 2B is a sectional view of the preferred embodiment of FIG. 2A, in a closed position.

FIG. 2D is a detail view of an area of the preferred embodiment of FIG. 2C.

FIG. 6B is a sectional front view of the body assembly of the preferred embodiment of FIG. 2A.

DETAILED DESCRIPTION OF THE DISCLOSURE

Figure 1A:
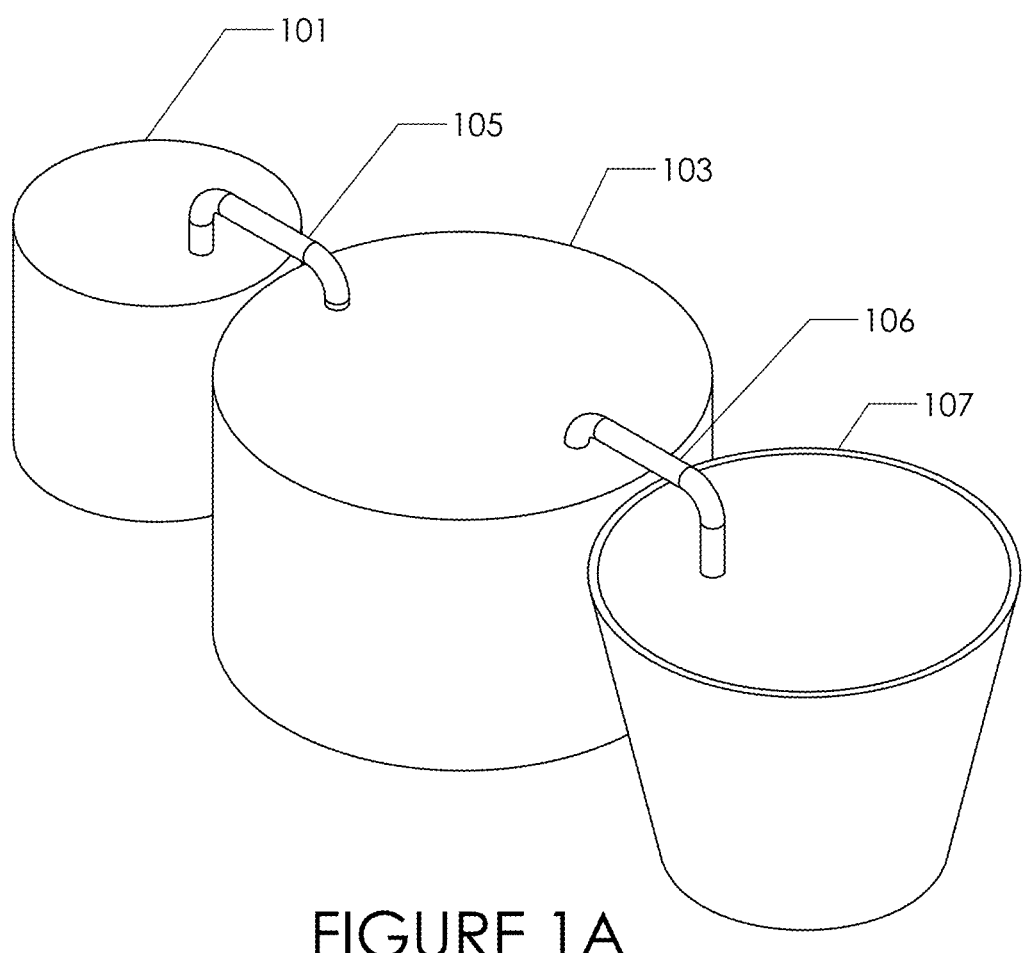
FIG. 1A is an isometric view of a simplified embodiment of a device for delivering liquid heated to a set temperature under pressure in a microwave oven, in accordance with embodiments of the present invention.
Figure 1B:
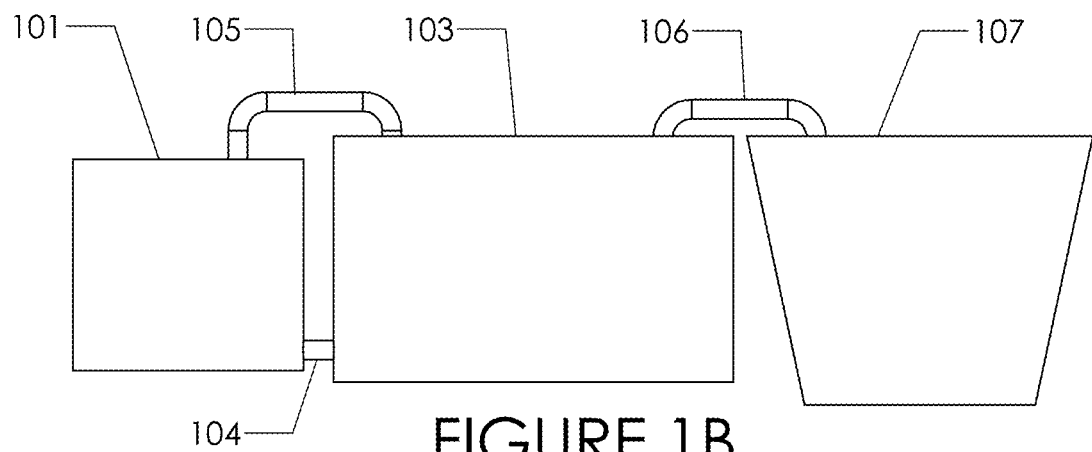
FIG. 1B is a front view of the simplified embodiment of FIG. 1A.
Figure 1C:
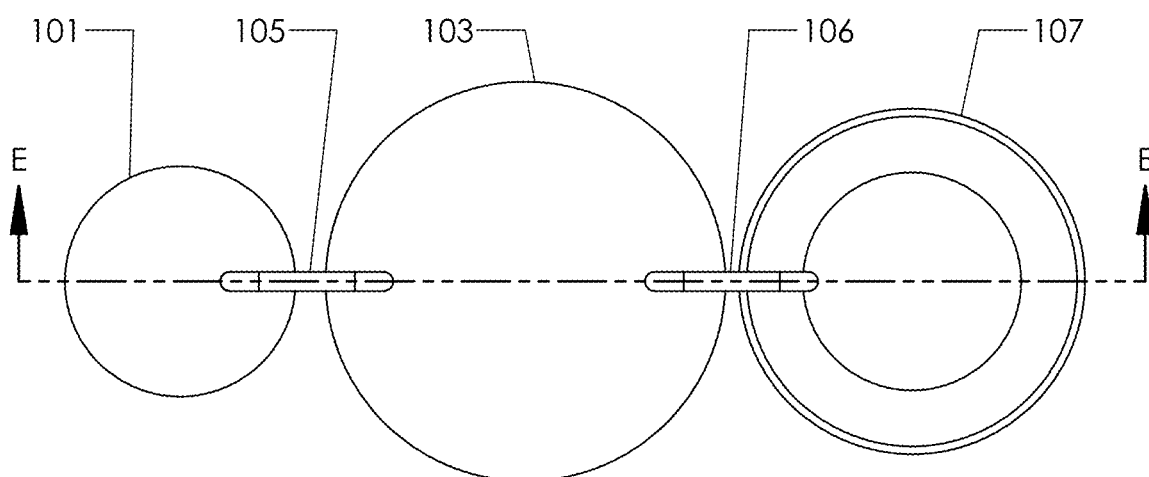
FIG. 1C is a top view of the simplified embodiment of FIG. 1A.
Figure 1D:
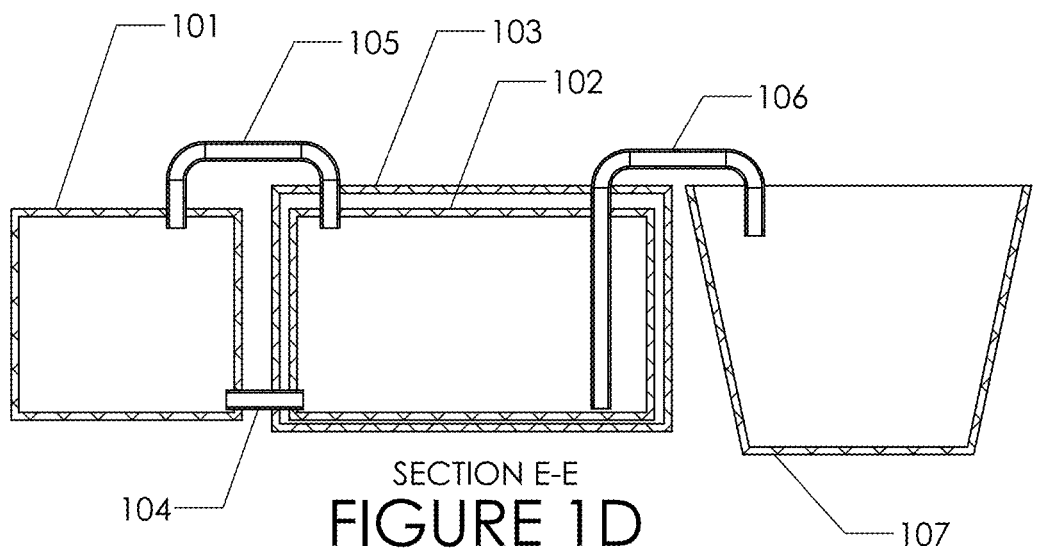
FIG. 1D is a sectional view of the simplified embodiment of FIG. 1A.
Figure 2A:
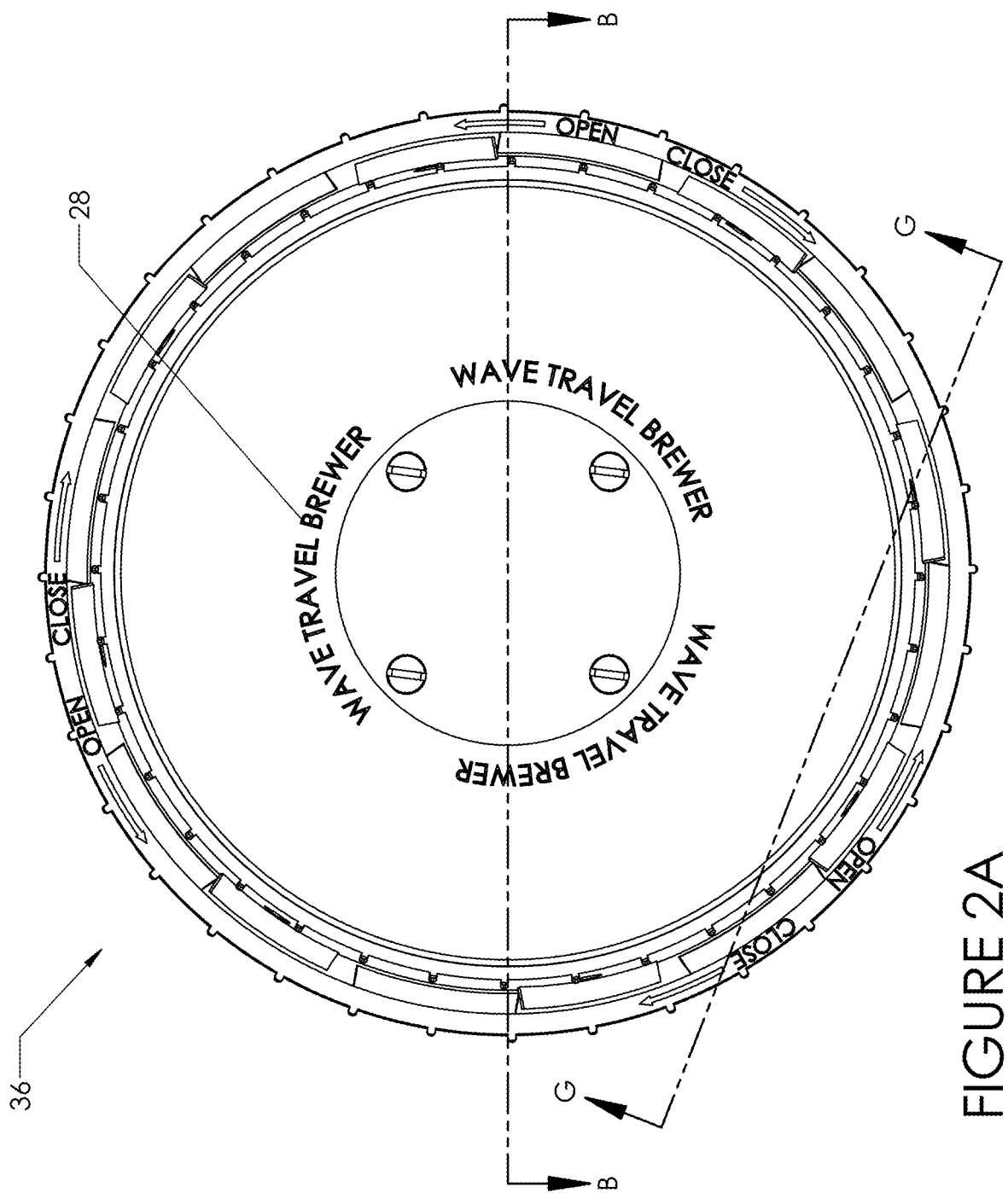
FIG. 2A is a top view of a preferred embodiment of a device for delivering liquid heated to a set temperature under pressure in a microwave oven, in a closed position.
Figure 2C:
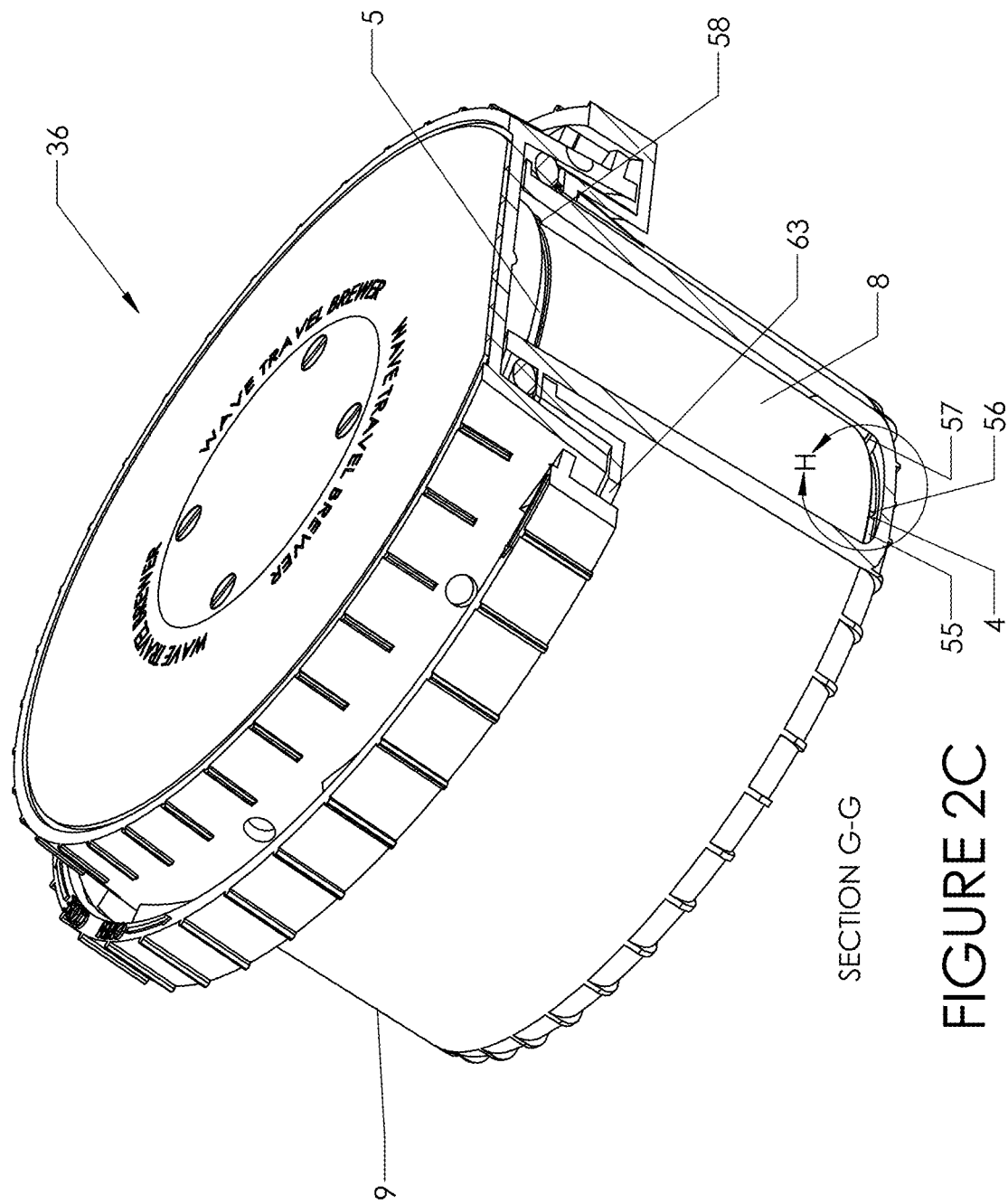
FIG. 2C is an isometric sectional view of the preferred embodiment of FIG. 2A, in a closed position.
Figure 3:
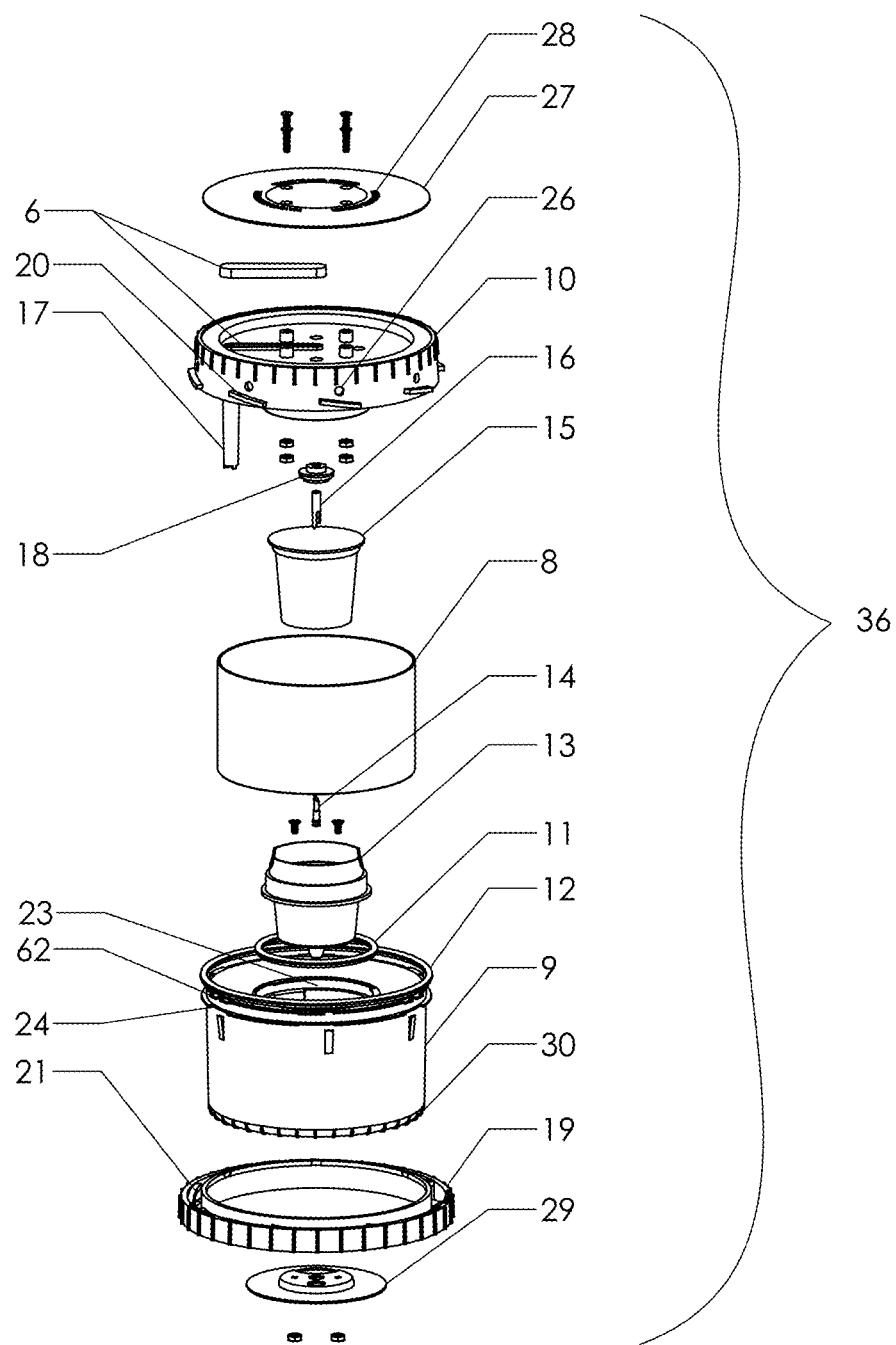
FIG. 3 is an exploded view from the front-top of the preferred embodiment of FIG. 2A.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise devices and methods for delivering liquid heated to a desired temperature under pressure in a microwave oven (referred to short handedly herein as a "microwave" for simplicity), generally, and specifically as used to make brewed beverages using single serve beverage cartridges. A device of embodiments of the invention goes inside a microwave oven and includes a plurality of chambers, typically two. Alternatively, the device could have one chamber with one or more partitions fully or partially separating two identical or different fluids. For the purposes of explaining the basic invention, two chambers will be used, and the liquid will be water. The preferred embodiment will illustrate a single chamber with a wall acting as a partition partially separating two sections of water and also shielding against microwave energy for one of the sections of water. It is possible to use more chambers and even have different liquids in different chambers.

The contents of the first chamber will be exposed to more microwave energy than the contents of the second chamber relative to the mass of the contents. The purpose is to increase the temperature of the contents of the first chamber at a faster rate than the increase in temperature of the contents of the second chamber. This can be accomplished in several ways, including but not limited to any one or more of the following:

1: The materials of construction of the first chamber may be transparent or at least more transparent to microwaves than the materials of construction of the second chamber. The materials of construction of the second chamber may partially or fully reflect or absorb the microwave energy preventing the microwave energy from heating the liquid enclosed in the second chamber or limiting the amount of heating of the liquid enclosed in the second chamber.

2: The materials of both chambers may be the same, with both being transparent or at least partially transparent to microwaves. But the second chamber may have external and/or internal shields to reduce the microwave heating of the liquid in that chamber. The shields may be fully effective (such that no heating of the liquid enclosed in the second chamber occurs) or just partially effective (such that limited heating of the liquid enclosed in the second chamber occurs). As discussed later in this description, it may be beneficial to have the liquid in the second chamber heated to a certain level by the microwave.

3: The materials of different surfaces of the chambers may vary with some being more transparent to microwaves than others.

4: The size, shape, and positioning of the chambers may be adjusted so the liquid in the first chamber increases temperature more quickly than the liquid in the second chamber. In the preferred embodiment discussed later, the second chamber is surrounded on the sides by the first chamber which causes the liquid in the first chamber to increase in temperature more quickly than the liquid in the second chamber.

The purpose of the first chamber is to create the driving force (pressure) to force the liquid out of the second chamber. Some of the liquid from the first chamber may also be mixed with liquid from the second chamber to increase the temperature of the liquid being propelled from the second chamber. To accomplish this, the first chamber is a vessel that is either permanently closed, except for tubes or other conduits or openings used to transfer liquid or pressure, or capable of being closed. When in use, the chamber is closed with liquid inside it. With the application of microwave energy to the liquid, the liquid will start to change state to a gas (i.e., boil). This will increase the pressure in the first chamber which can be transferred to the second chamber via a vapor flow path to propel the contents of the second chamber to where the contents are needed. For safety, both chambers should typically include a pressure relief device in case of an overpressure situation due to a clogged output or other unforeseen malfunction. Preferably, the pressure relief would automatically reset when pressure returned to the normal range. Preferably, the gas vented by the pressure relief valve would be defused and not directed outward in a manner that could harm a user if the user opened the microwave oven door just as the system was venting.

The second chamber contains some or all of the liquid to be delivered in a desired temperature range. With the appropriate device, the delivered liquid temperature can be set to a temperature as low as the starting temperature of the liquid to a temperature as high as the boiling temperature of the liquid.

There are several variables that can be adjusted to set the temperature range of the liquid to be delivered from the second chamber:

Relative amounts of liquid in each chamber:

The first chamber needs at least enough liquid to generate sufficient gas to drive the liquid out of the second chamber. If there is a liquid flow path between the chambers, the first chamber can receive more liquid from the second chamber if needed. Depending on the design of the apparatus, extra liquid will either be wasted or transferred to the second chamber and delivered with the liquid in the second chamber to the required destination. Minimizing the liquid in the first chamber will help the liquid in the first chamber boil more quickly, and push the liquid out of the second chamber sooner. This lowers the amount of heat possibly absorbed by the liquid in the second chamber, thus reducing the temperature of the delivered liquid.

The total liquid between the chambers must be sufficient to meet the downstream needs. If liquid from the first chamber will not be transferred into the second chamber, the total amount of liquid in the second chamber must be sufficient to meet the downstream needs. If the second chamber does not have perfect shielding against microwaves or heat conducted from the first chamber, then the temperature of the liquid in the second chamber will increase slower than the liquid in the first chamber if there is a larger volume of liquid in the second chamber. Therefore the delivered liquid would be cooler.

Level of microwave shielding in each chamber:

If the first chamber has zero shielding against microwave energy and the second chamber has perfect shielding from microwave energy as well as conducted heat, then the delivered fluid from the second chamber can be at or very near the starting temperature of the fluid in the second chamber. This would also require substantially no transfer of fluid from the first chamber into the second chamber.

If a warmer delivery temperature is required, reducing the effective shielding on the second chamber will result in the enclosed fluid in the second chamber heating up while the fluid in the first chamber is also heating. The shielding can be reduced until the desired delivery temperature is reached approximately when the fluid in the first chamber begins to boil.

Any additional shielding, intentional or otherwise, of the first chamber will require an increase in shielding of the second chamber to achieve the same results.

Amount of fluid interaction between chambers:

No interaction is the simple solution, but there are advantages of interaction, such as: less waste of water and energy, and it is easier to fill just one chamber and have fluid automatically go to both chambers. In the preferred embodiment, a liquid flow path for fluid between the two volumes is included that is large enough that the level in the different chambers remains approximately even with each other, and drops at approximately the same rate as fluid exits the second chamber. However, the liquid flow path between the two chambers is constricted enough that the two different temperature fluids can remain with minimal mixing.

Starting temperature of the fluid in each chamber:

In most cases the starting temperature of the fluid in the first and second chamber would be identical. If a cooler output temperature is desired, a hotter starting temperature in the first chamber would cause it to boil sooner, thereby pushing the cooler fluid in the second chamber to the output before the fluid in the second chamber has a chance to heat up as much as it would if both fluids started at the same temperature.

The reverse is also possible. If a warmer output temperature is desired, a colder starting temperature in the first chamber would cause the fluid in the first chamber to boil later, thereby pushing the fluid in the second chamber to the output after the fluid in the second chamber has had more time to heat up and is therefore warmer. There is a possibility of starting with too much of a temperature differential causing the water in the second chamber to boil first. This would cause water at or possibly slightly above boiling temperate to exit the system. The reason it could be slightly above boiling temperature is because there will be a slight positive pressure in the chambers resulting in a higher boiling temperature than under standard atmospheric conditions. As soon as liquid above boiling temperature exits the system, the liquid will turn to vapor as it is no longer under pressure.

Shapes of conductive materials subject to microwaves should be rounded to eliminate arcing or sparking inside the microwave. If sharp items are necessary, it is better if such sharp items can be shielded from the microwave energy.

While the invention can be used to deliver hot liquid to anything within the microwave oven, the preferred embodiment is designed to push hot liquid through a single serve beverage cartridge, also termed a K-cup style pod (K-cup is a registered trademark of Keurig Dr Pepper Inc.), which contains an infusible material, and into a microwave safe cup or bowl. K-cup style pods include single-use (disposable) pods as well as reusable and/or recyclable pods. The preferred embodiment of the device is adapted to sit on the rim of the receiving cup or bowl.

Please refer to FIG. 1A through FIG. 1D for the following explanation of a simplified system of a device for delivering liquid heated to a desired temperature under pressure in a microwave oven.

A simplified embodiment of the invention can be described as follows:

There is a first chamber 101 made of material essentially transparent to microwave energy, a second chamber 102 either opaque or partially opaque to microwave energy. If the second chamber 102 is not opaque or partially opaque, there is an external shield 103 around the second chamber 102 rendering the second chamber 102 opaque or partially opaque to microwave energy. The external shield 103 could be around the second chamber 102 even if the second chamber 102 is opaque or partially opaque.

Both chambers have a means (not shown in FIGS. 1A-D) to be filled with liquid. Both chambers can be closed or are built closed so both chambers can contain at least a small amount of positive pressure relative to ambient pressure.

There is an optional liquid flow path 104 or paths between the two chambers that allows the level of liquid in each chamber to remain equal with each other. This is not essential to the functioning of the system, but helps use more of the fluid and enables one filling operation for both chambers instead of one for each chamber. The liquid can flow in either or both direction(s) through the optional liquid flow path. Typically this flow path will be at or near the bottom of both chambers.

There is a vapor flow path 105 or paths between the two chambers that allows the pressure to equalize in each chamber. Generally during operation, vapor will flow from the first chamber 101 to the second chamber 102 as the vapor is being generated in the first chamber 101 due to the liquid in the first chamber 101 being more exposed to the microwave energy as the system is used. Typically this flow path will be at or near the top of both chambers. The vapor flow path 105 must be near the top of the first chamber 101, otherwise the vapor flow path 105 will transfer the liquid out of the first chamber 101 prematurely. The vapor flow path 105 can be anywhere in the second chamber 102, but above the liquid level works best. If the vapor flow path 105 is below the liquid level the vapor could condense before reaching the surface and would not then create the necessary pressure increase in the second chamber.

There is a liquid/vapor flow path 106 from the second chamber 102 to the delivery point for the fluid. This liquid/vapor flow path 106 starts in the liquid of the second chamber 102, preferably near the bottom, and ends at the delivery point for the fluid, which is beyond the scope of this simple embodiment. The delivery point could be in a cup 107 as illustrated in FIG. 1, or into the receiving point of a coffee pod (not shown). Also not shown in FIGS. 1A-D is an optional whistle on the end of the liquid/vapor flow path. When liquid is flowing through the tube of the liquid/vapor flow path 106, the necessary resonance for a whistle would not be created. When all liquid has been dispensed and some extra steam is exiting the tube, a whistle sound would be generated informing the user that the process is complete.

Not shown in this simplified illustration is any type of pressure relief system. A pressure relief system is highly advisable to prevent accidental rupturing of either chamber due to overpressure should there be a problem in the system.

Typical operation of a simplified embodiment of the invention using water can be described as follows:

Room temperature water is placed in the first chamber 101 and the second chamber 102 (either separately into each chamber, or into one or the other of the chambers with the water flowing between the chambers via the liquid flow path 104).

Both chambers are closed, thereby forming vessels capable of containing some pressure.

The device is placed in a microwave with a cup 107 for receiving the liquid under the output (i.e., the liquid/vapor flow path 106) of the device.

The microwave is closed and turned on. If a known quantity of water at room temperature is always used, the microwave timer can be set to run for the needed amount of time (which may be predetermined).

The microwave energy begins heating the water in both chambers. The water in the first chamber 101 heats more quickly since there is no shielding around the first chamber (or because of a difference in materials used to create the first and second chambers), and because of different water volumes in the different chambers, so more of the microwave energy is absorbed by the water in the first chamber per unit volume. Depending on the effectiveness of the shielding in the second chamber 102, the water in that chamber will typically heat as well, just not as quickly as the water in the first chamber 101. In many applications it is desirable to have only partially effective shielding on the second chamber 102, as the user typically wants the water to be heated to a certain level.

When the water in the first chamber 101 begins to boil, it generates steam. This creates pressure which is passed through the vapor flow path 105 or paths into the second chamber. This pressure forces water that is not at boiling temperature out of the second chamber 102 though the liquid/vapor flow path 106 into the receiving cup 107.

If more water than needed for steam is in the first chamber 101, as the level of the second chamber 102 drops, some water from the first chamber 101 will flow into the second chamber 102 through the liquid flow path 104 or paths between the first and second chamber. This allows more complete utilization of the water and the energy that has been imparted on it.

Once the water has been dispensed, the process is complete. The microwave is shut off (either manually, or automatically when the preset amount of time has expired) and the receiving cup 107 and device are removed from the microwave. The amount of time needed can be determined on the first use in a given microwave oven. The user can hear when the process is complete as the invention makes a sound similar to the sound when a drinking straw is used to empty a glass.

Please refer to FIGS. 2A-D, FIG. 3, FIG. 4, FIGS. 5A-C, FIGS. 6A-E, and FIG. 7 for the following explanation of the preferred embodiment of a device 36 for delivering liquid heated to a set temperature under pressure in a microwave oven.

The preferred embodiment is designed for use with K-cup style single-use coffee pods, or reusable pods, and that use will be described below.

The preferred embodiment utilizes one vessel with two defined volumes separated by a shield, hot/cold separator 8. The vessel is comprised of two main parts, a vessel body 9 and a vessel lid 10. In the preferred embodiment the vessel body 9 and vessel lid 10 are made out of high temperature plastic which is mostly transparent to microwaves. There is an inner seal 11, and an outer seal 12 between the lid 10 and the body 9 forming a sealed approximately rectangular toroidal volume 22 (best seen in FIG. 6B) when the lid 10 is in place on the body 9. The inner seal 11 and the outer seal 12 may be constructed of any suitable material that can provide the desired water/steam sealing function, such as any suitable rubber material (natural and/or synthetic).

Figure 6A:
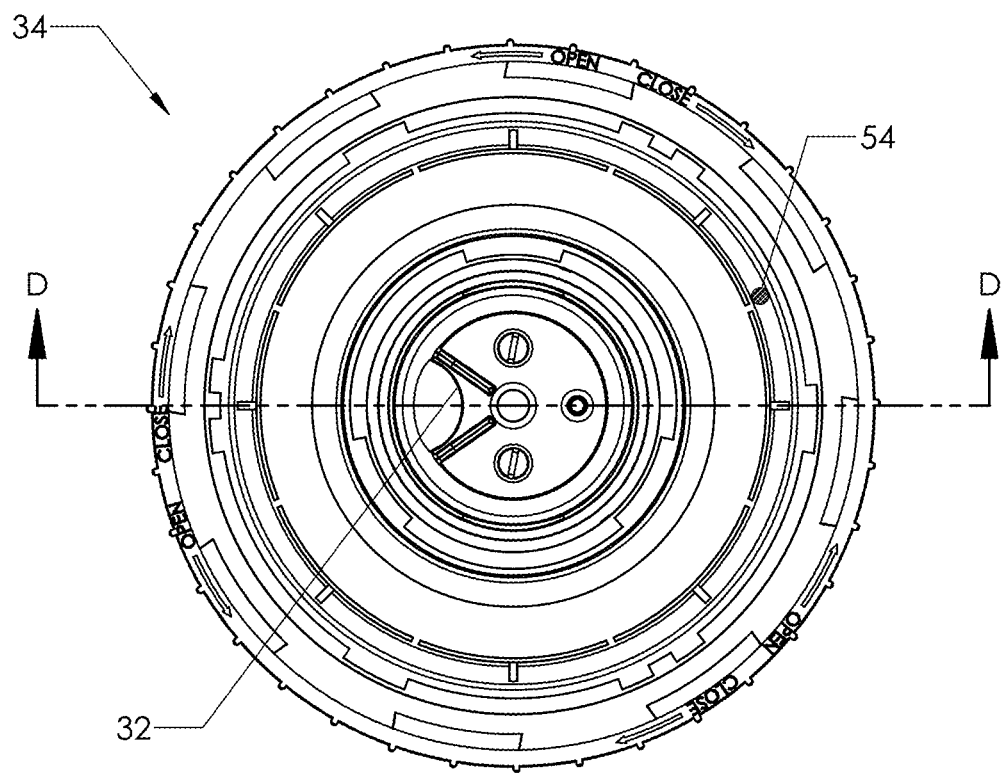
FIG. 6A is a top view of a body assembly of the preferred embodiment of FIG. 2A.
Figure 6C:
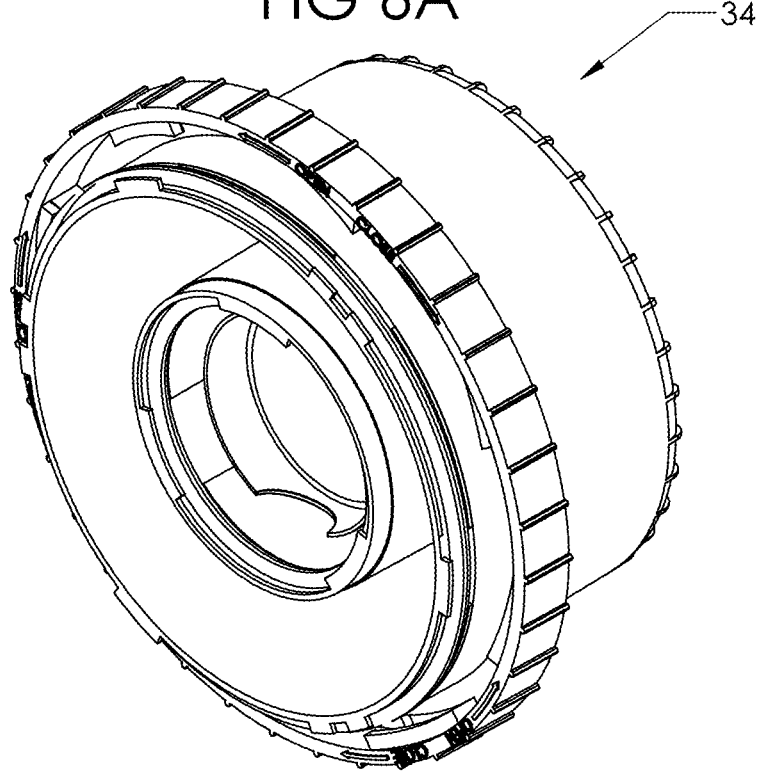
FIG. 6C is an isometric view of the body assembly of the preferred embodiment of FIG. 2A.
Figure 6D:
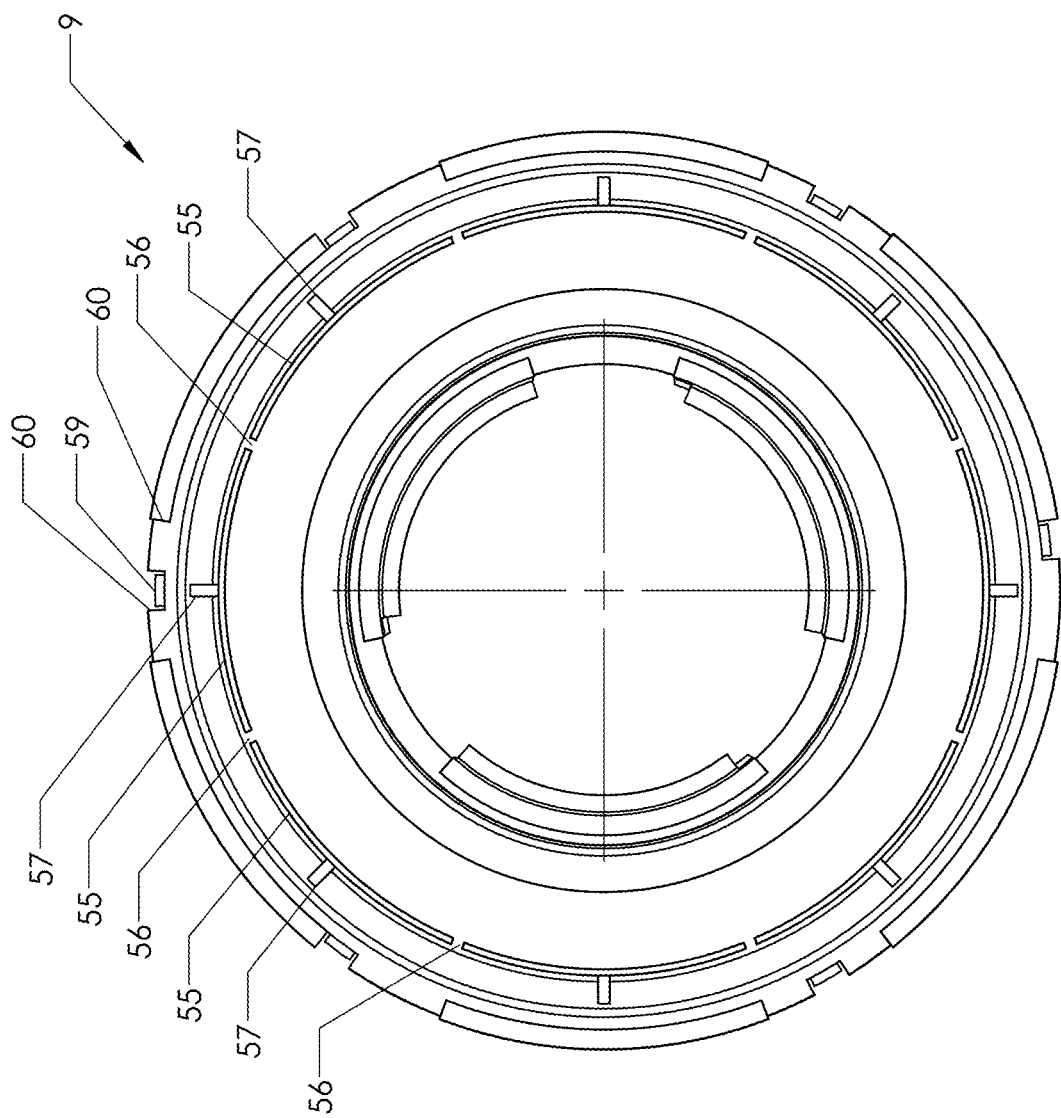
FIG. 6D is a top view of the vessel body of the preferred embodiment of FIG. 2A.

Within this sealed approximately rectangular toroidal volume 22 is a shield, hot/cold separator 8. In the preferred embodiment, the shield, hot/cold separator 8 is made out of aluminum or steel, which is not mostly transparent to microwaves. This shield acts as both a physical barrier creating a first chamber 1 on the outside of the shield, and a second chamber 2 on the inside of the shield. The shield, hot/cold separator 8 also acts as the outer side microwave shield for the second chamber 2 to prevent or reduce microwave energy from reaching the fluid in the second chamber. In FIGS. 2D, and 6D it can be seen in the preferred embodiment that the shield, hot/cold separator 8 is supported slightly above the bottom of the approximately rectangular toroidal volume 22 by support tabs 57. The shield, hot/cold separator 8 is held centered in the vessel body 9 by centering ridge 55 projecting upward from the inside bottom surface of the vessel body 9. The diameter of the shield, hot/cold separator 8 is slightly larger than the diameter of the centering ridge 55 such that the bottom end of the shield, hot/cold separator 8 surrounds the top end of the centering ridge 55. The centering ridge 55 has gaps 56 located around the centering ridge 55 circumference. These features create the optional liquid flow path 4 between the two chambers described in the simplified embodiment. The liquid flow path 4 is formed by the bottom of the shield, hot/cold separator 8, the sidewalls of each gap 56, and the inside bottom of vessel body 9. The preferred embodiment shows eight liquid flow paths 4, but any suitable number may be used. Experimentation is necessary to determine the correct number and size of the liquid flow paths 4 for any application. There is also an opening or gap between the top of the shield, hot/cold separator 8 and the vessel lid 10. This top gap is maintained with hold down tabs 58 (FIG. 2B, FIG. 2C, and FIG. 5B) projecting downward from the main inside surface of the vessel lid 10 which keeps the shield, hot/cold separator 8 in place and slightly away from the main inside surface of the lid. This gap serves as the vapor flow path 5 between the two chambers described in the simplified embodiment. Alternatively, the shield, hot/cold separator 8 could reach all the way to the main inside surface of the lid and holes or similar openings (not illustrated) defined in the shield, hot/cold separator 8 above the water line could be employed as the vapor flow path.

The term "first chamber" as used herein refers to a chamber adapted to receive and hold a liquid and, when that first chamber liquid is exposed to microwave energy, at least some of the first chamber liquid will turn into a gas and at least some of the gas will flow into a second chamber. The term "second chamber" as used herein refers to a chamber adapted to receive and hold a liquid such that, when gas from the first chamber flows into the second chamber, at least some of the second chamber liquid is forced out of the second chamber into a location/space different than the first or second chambers. The first and second chambers may receive and hold the same type of liquid or a different type of liquid. Some of the liquid may flow between the first and second chambers. The first and second chambers may be formed from a single larger chamber that is divided into two (or more) chambers, such as by a dividing wall. The dividing wall may be permanently in place or may be selectively removable. Embodiments of the invention may have more than one first chamber and/or more than one second chamber.

Inside of the inner seal 11, the vessel body 9 is shaped to receive a K-Cup® style coffee pod or reusable pod or the like. This area to receive the pod can be molded as part of the main body 9, or can be a separate part. In the preferred embodiment shown the area to receive the pod is a separate pod receiving unit 13. At the bottom of the pod receiving unit 13 is a lower needle 14 which pierces the bottom of the pod 15 when the pod is inserted into the pod receiving unit 13. There is also a cutout 32 (seen in FIGS. 6A and 6B) in the bottom of the pod receiving unit 13 that allows the user to push a used pod upward and out of the pod receiving unit 13 to readily remove the pod 15 from the device.

The vessel lid 10 contains a liquid insertion needle 16 for piercing the top of the pod 15, and a liquid pickup tube 17 for drawing water from the vessel. The liquid pickup tube 17 is positioned substantially vertically within the second chamber 2. The liquid pickup tube 17 has an open bottom end (or one or more openings near its bottom end) at or near the bottom of the second chamber 2. The open bottom end of the liquid pickup tube may have a flare 43 for safety (best seen in FIG. 8B). Such a flared open bottom end of the liquid pickup tube is to prevent impalement if a thin walled tube is used for the liquid pickup tube (best seen in FIG. 8B, item 42). There is also a liquid/vapor flow path 6 connecting the liquid insertion needle 16 and the liquid pickup tube 17. Pressure forces liquid in the second chamber 2 into and up the liquid pickup tube 17, through the liquid flow path 6, and out the liquid insertion needle 16 into the pod 15.

The liquid insertion needle 16 pierces the pod 15 when the vessel lid 10 is attached to the vessel body 9. There is an elastomer pod sealer 18 around the needle 16 to form a seal with the top of the pod. In the preferred embodiment there is a locking ring 19 captured on the vessel body 9 but free to rotate on the main vessel body 9 axis. The locking ring 19 is held up by locking ring supports 59 (FIG. 6E) in the side of the vessel body 9. The locking ring 19 is prevented from moving upward by the protruding lower sidewall of the outer seal groove 62. In the preferred embodiment there are eight inclined tabs 20 equally spaced about the perimeter of the vessel lid 10 and eight corresponding inclined tabs 21 equally spaced about the locking ring 19 (although a different number of tabs 20 and tabs 21 may be used). The inclined tabs 20 of the lid 10 mate with the corresponding inclined tabs 21 of the locking ring 19 with a twist of the locking ring 19 to securely fasten the vessel lid 10 to the vessel body 9. Any other suitable mechanism may be used to lock the lid 10 to the body 9 during use.

Figure 6E:
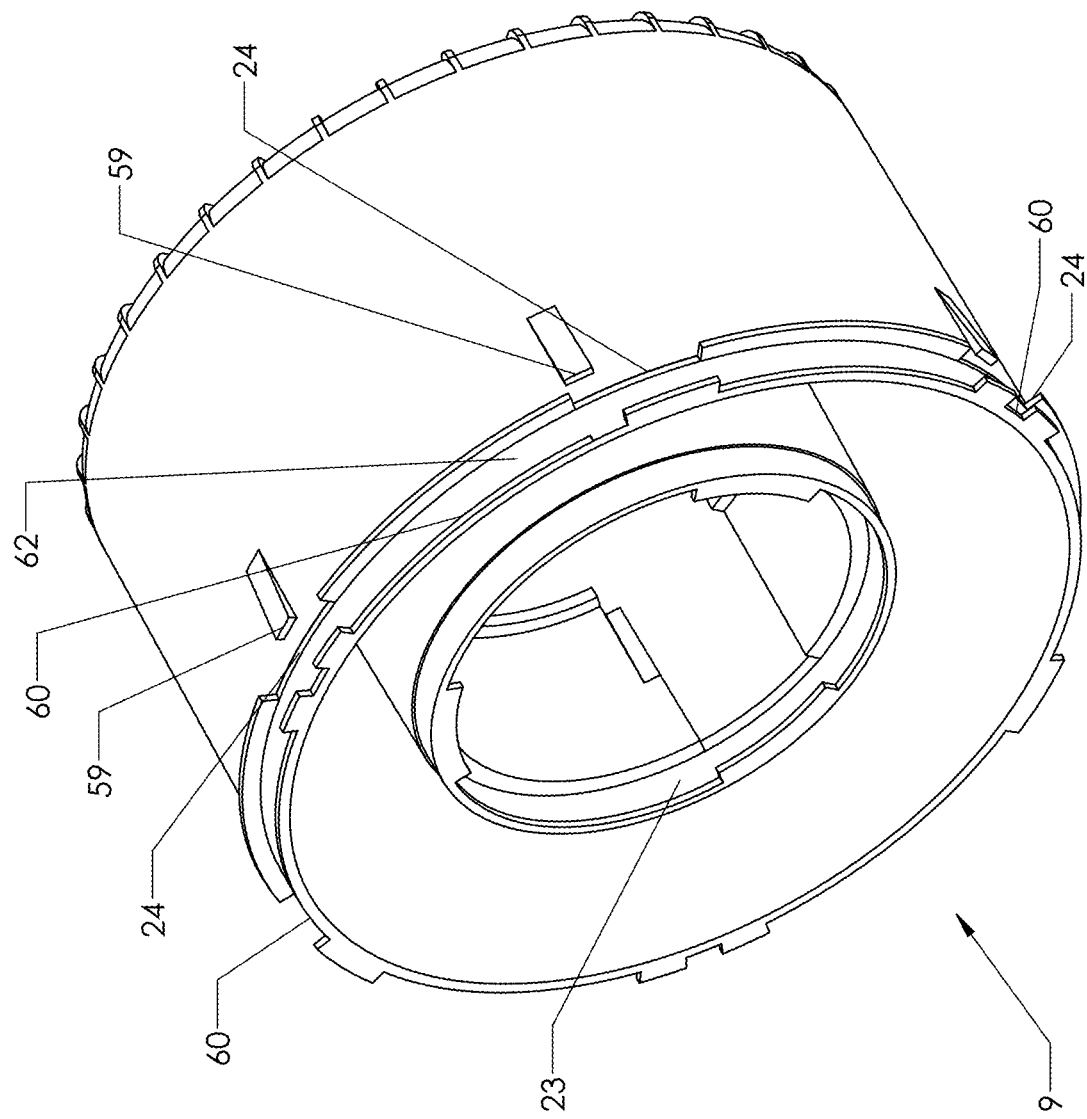
FIG. 6E is an isometric view of the vessel body of the preferred embodiment of FIG. 2A.

The preferred embodiment uses two radial seals, an inner seal 11 and an outer seal 12 as shown in FIG. 2B to seal the lid to the body on the inside and outside edge of the approximately rectangular toroidal volume 22. The main sealing areas are on the inner diameter (ID) and outer diameter (OD) of the inner seal 11 and the outer seal 12. The seals sit in seal grooves 23 and 62 to hold them in position, but in this low pressure application a fully formed seal groove is not necessary. In the preferred embodiment, groove sidewall gaps 24 (FIG. 6E) are included in the sidewall of the seal groove of the outer seal 12. The groove sidewall gaps 24 are on the side of the groove that the seal would migrate towards when the system is under pressure. By controlling the length of the groove sidewall gaps 24, the physical properties of the seal material, the squeeze of the seal, and the friction of the seal material against the vessel body 9 and the vessel lid 10, the seal will deform through the gap in the sidewall of the seal groove if there is excess pressure inside the approximately rectangular toroidal volume 22, thereby breaking the seal and releasing said pressure. The pressure will be relieved into the area of the locking ring 19 in the preferred embodiment so the danger of an operator being burned by steam is eliminated. Seal groove 23 may also use sidewall gaps to release excess pressure. In FIG. 6E gaps 60 are also seen in the opposing sidewall of the seal groove 62 as well as the opposing sidewall of seal groove 23. These opposing sidewall gaps are to facilitate molding of the vessel body and do not serve a specific function for the invention.

To make it easy for a user to close the vessel lid 10 and compress the inner seal 11 and outer seal 12 as needed to prevent leaks, two long sloped contact regions 25 and 64 (best seen in FIG. 5B) are included where the seals are compressed while the vessel lid 10 is being closed. The long sloped contact region gives a mechanical advantage for compressing the seals. The potential disadvantage of this is, since the inner seal 11 and outer seal 12 will start to seal before the vessel lid 10 is fully closed, the action of closing the vessel lid 10 the remaining distance after seal is established will cause pressure to build in the enclosed approximately rectangular toroidal volume 22, prematurely forcing fluid up fluid pickup tube 17, through liquid/vapor flow path 5, through liquid insertion needle 16 in to pod 15. To mitigate this, vent holes 26 are included around the vessel lid 10 just outside of the sealed area during operation. They allow most of the otherwise trapped air to escape while still allowing the inner seal 11 and outer seal 12 to be compressed during the vessel lid 10 closing operation.

In the preferred embodiment, there is a top shield 27 on the top of the vessel lid 10. This shield serves three main purposes. First, it shields the second chamber 2 and pod 15 area from microwave energy. Second, it protects and conceals the liquid/vapor flow path 6. Third, it provides an excellent surface for a product logo or promotional indicia 28.

In the preferred embodiment, there is a bottom shield 29 on the bottom of the vessel body 9. This shield serves two main purposes. First, it shields the pod 15 area from microwave energy. Second, it decreases the lower range of diameters of the cup 7 (see FIG. 7) that can support this preferred embodiment. Since the preferred embodiment sits on top of a cup 7 inside the microwave oven 35, it is desirable to work with the broadest range of cup 7 sizes possible. For this same reason, in the preferred embodiment small radial fins 30 are incorporated along the outer bottom edge to allow for stable placement of the device on larger cups. The bottom shield 29 can be enlarged to shield more of the bottom of the second chamber 2 if necessary for a given application.

The vessel body 9 preferably has a small rough spot 54 (FIG. 6A) near the bottom that is located in the area that is called the first chamber 1. This rough spot is in contact with the water in the first chamber 1. The purpose of the rough spot is to create a nucleation site to start the water boiling and help prevent the water from becoming superheated if someone uses very pure water in the device.

Figure 4:
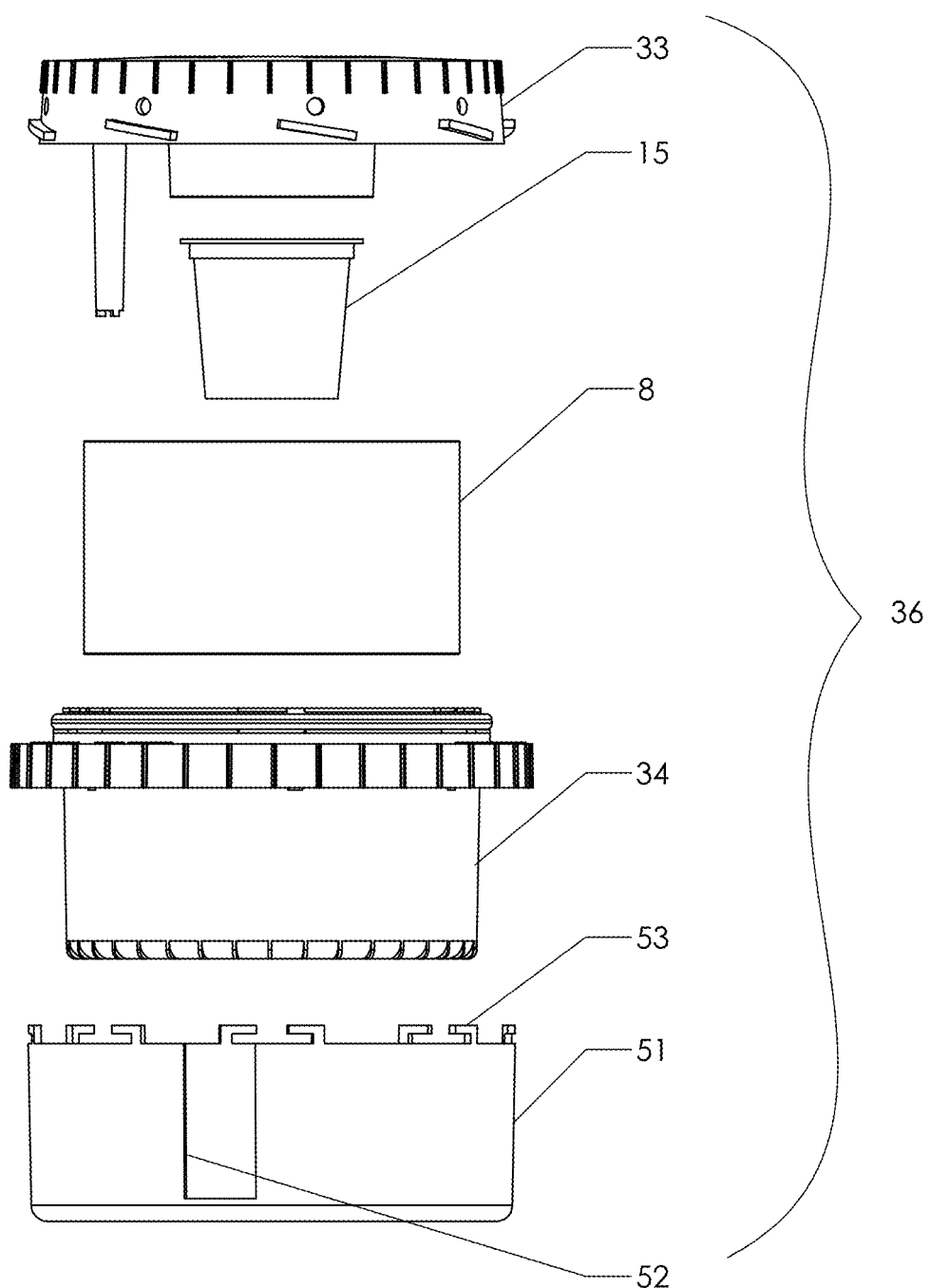
FIG. 4 is a front view of the preferred embodiment of FIG. 2A, in an open position with the pod, shield, and cup shield exploded.
Figure 5A:
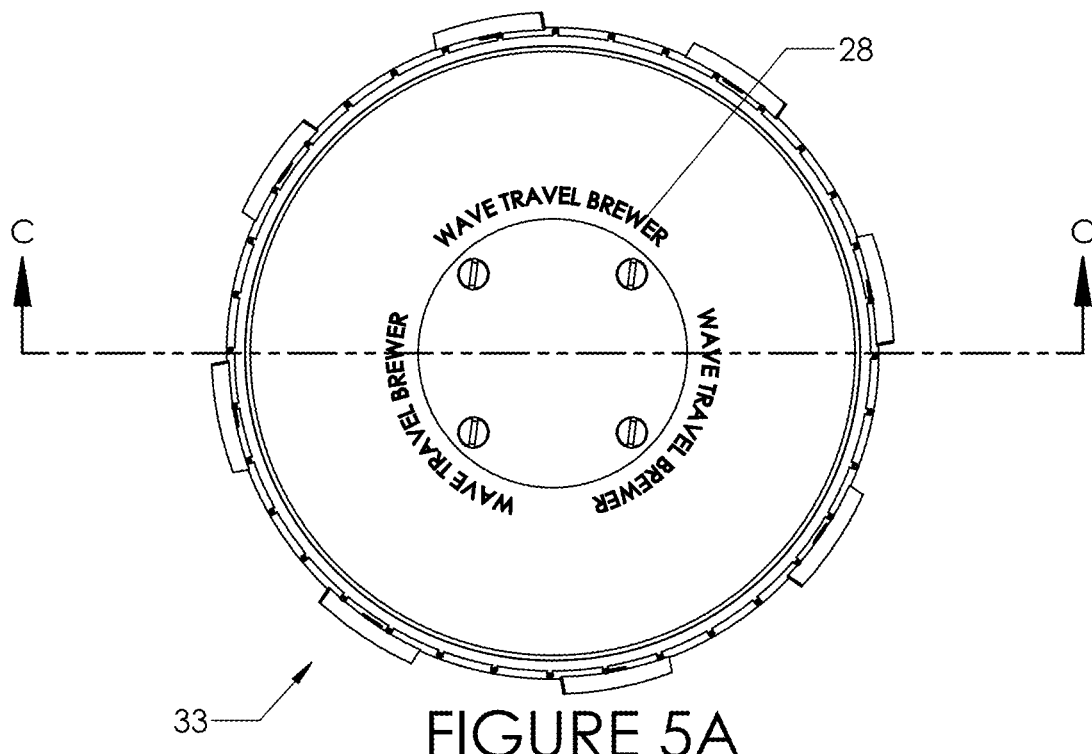
FIG. 5A is a top view of a lid assembly of the preferred embodiment of FIG. 2A.
Figure 5C:
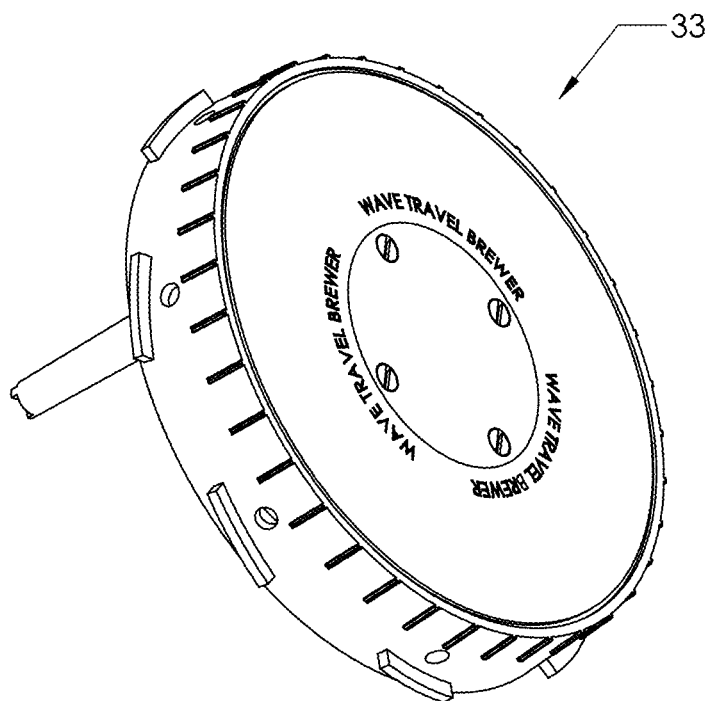
FIG. 5C is an isometric view of the lid assembly of the preferred embodiment of FIG. 2A.
Figure 5B:
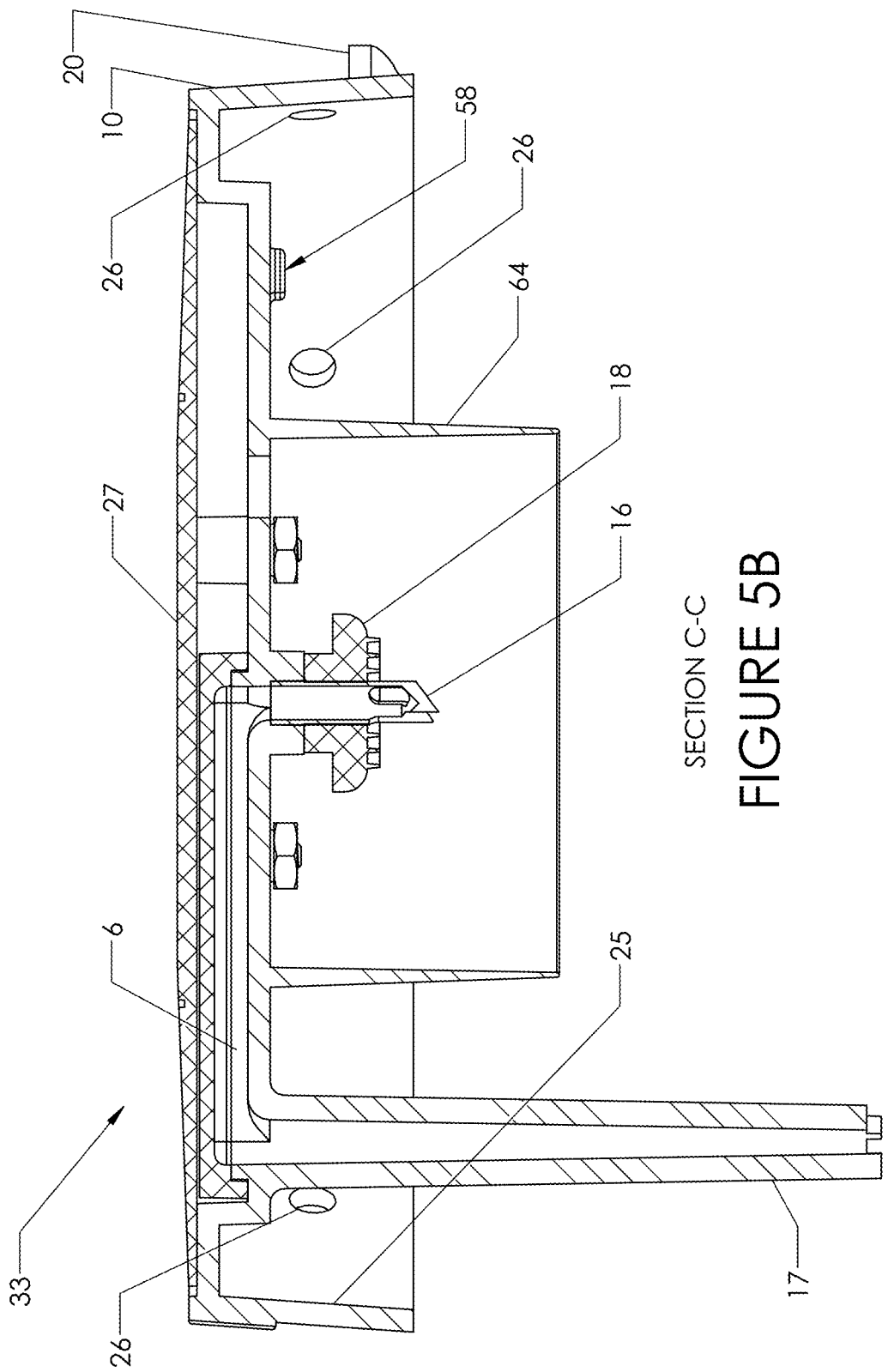
FIG. 5B is a sectional front view of the lid assembly of the preferred embodiment of FIG. 2A.
Figure 7:
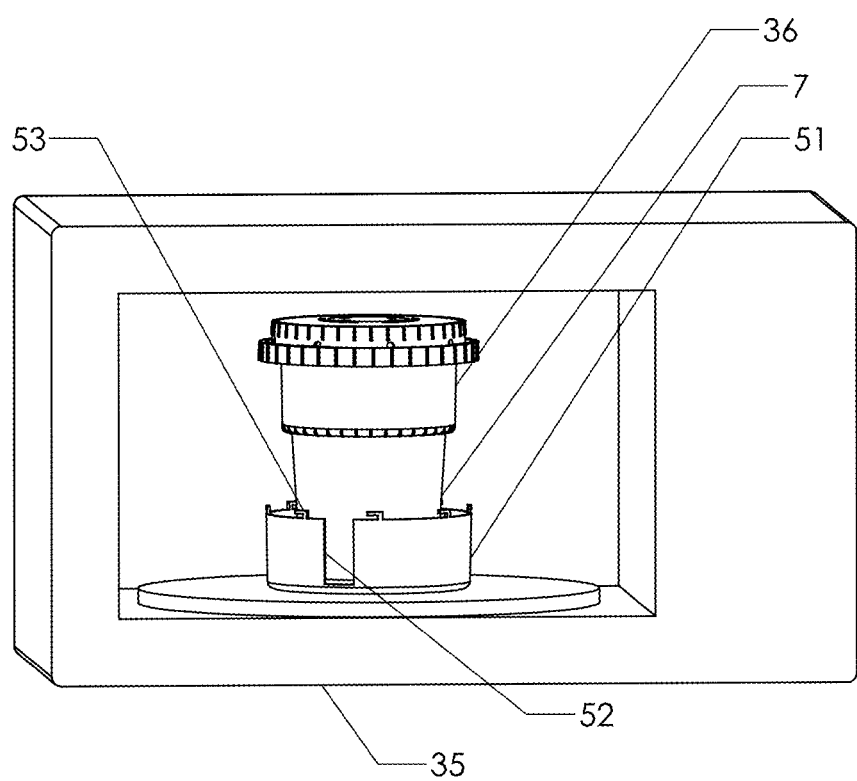
FIG. 7 shows the preferred embodiment of FIG. 2A in use on a cup with a cup shield in a microwave oven.

An optional feature of the preferred embodiment is a cup shield 51 as shown in FIG. 4 and FIG. 7. The cup 7 sits in the cup shield 51 to decrease the amount of microwave energy the fluid delivered to the cup is exposed to while in the cup and before the process ends. The level of shielding required varies with the application. In the preferred embodiment the cup shield includes a slot 52 for mug handles, and tabs 53 that connect the cup shield 51 to the preferred embodiment 36 for storage. Slots 63 (FIG. 2C) in the bottom of the locking ring 19 mate with the corresponding tabs 53 in the cup shield 51 to hold the cup shield 51 in place for storage. Perfect shielding where all the microwave energy is shielded from the liquid in the cup 7 is not generally advised because once all the liquid has been transferred to the cup 7, there would be nothing left to absorb the microwave energy produced by the microwave oven 35, and damage to the microwave oven 35 could occur.

The user typically does not interact with all the individual parts described above. As seen in FIG. 4, there are typically only five items/assemblies that the user interacts with: The device 36 of the preferred embodiment of the invention comprises the lid assembly 33 (FIGS. 5A-C), the body assembly 34 (FIGS. 6A-C), the shield, hot/cold separator 8, the pod 15, and the cup shield 51. Of these five, the shield, hot/cold separator 8 could be part of the body assembly 34, further reducing the number of parts a user interacts with normally.

Typical operation of the preferred embodiment of the invention using water can be described as follows:

The cup shield 51 is removed from the preferred embodiment 36. The lid assembly 33 is removed from the body assembly 34.

A pod 15 containing an infusible material (e.g., coffee grounds) is placed in the pod receiving unit 13 and pushed down on the lower needle 14.

Room temperature water is placed in the vessel (into either the first chamber 1 or second chamber 2, or both) up to the fill line 31. The water will automatically fill both the first chamber 1 and second chamber 2 to the same level.

The lid assembly 33 is placed on the body assembly 34 and pushed down. This causes the liquid insertion needle 16 in the lid assembly 33 to pierce the pod 15, and the inner seal 11 and outer seal 12 to compress between the vessel body 9 and vessel lid 10.

The locking ring 19 is turned in the closed direction to lock the vessel lid 10 to the vessel body 9.

A cup 7 is placed in the center of the cup shield 51. If the cup has a handle, the handle extends out the slot 52 in the cup shield 51. The cup 7 and cup shield 51 are placed in the microwave oven 35.

The preferred embodiment 36 is placed in a microwave oven 35 approximately centered on top of a cup 7 for receiving the coffee or other output from the pod 15 (shown in FIG. 7).

The microwave is closed and turned on. If a known quantity of water at room temperature is always used, the microwave timer can be set to run for the needed amount of time. In the preferred embodiment that time is approximately three minutes for ten ounces of coffee.

The microwave energy begins heating the water in both the first chamber 1 and, to a lesser degree, the second chamber 2. The water in the first chamber 1 heats more quickly since there is no shielding around the outside of the first chamber 1, so most of the microwave energy is absorbed by the water in the first chamber 1. Depending on the effectiveness of the shielding in the second chamber 2, the water in that chamber will heat as well, just not as quickly as the water in the first chamber (as described above, the water in the second chamber may optionally not receive any microwave energy). In many applications it is desirable to have only partially effective shielding on the second chamber 2, as the user typically wants the water in the second chamber 2 to be heated to a certain level.

When the water in the first chamber 1 reaches boiling temperature, some or all of the water in the first chamber 1 turns to steam. The transition of water in the first chamber 1 into steam expands its volume, and the increased volume in the closed space increases the pressure. The expansion and increase in pressure drives at least some of the steam through the vapor flow path 5 into the second chamber 2. This driven steam forces water (that is likely not at boiling temperature) out of the second chamber 2 though the liquid pickup tube 17, through the liquid/vapor flow path 6, through the liquid insertion needle 16, and into the coffee pod 15. The water continues through the pod and exits through the lower needle 14 at the bottom of the pod as a brewed beverage (e.g., coffee). The brewed beverage exits into the cup 7 upon which the preferred embodiment 36 sits.

The cup shield 51 limits the exposure to microwave energy of the brewed beverage in the cup 7. This prevents the brewed beverage from over-heating and boiling. This could affect taste as well as being too hot to drink immediately after preparation.

If there is more water than is needed for steam in the first chamber 1, as the level of the second chamber 2 drops, some water from the first chamber 1 will flow into the second chamber 2 through the liquid flow path 4 between the first chamber 1 and second chamber 2. This allows more complete utilization of the water and the energy that has been imparted on it.

Once the water has been dispensed, the process is complete. The microwave oven 35 is shut off and the cup 7, cup shield 51, and preferred embodiment 36 are removed. The preferred embodiment 36 is opened by turning the locking ring 19 in the "open" direction. The interaction of the inclined tabs, 20 and 21, assist with separating the lid assembly 33 from the body assembly 34. The used pod 15 is ejected by pushing it out with a finger or utensil through the ejection cutout 32 in the bottom of the pod receiving unit 13.

There are a number of different methods of changing the output temperature in the preferred embodiment of the invention, such as the following:

Changing the shield, hot/cold separator 8 diameter will change the volume ratio of the first chamber 1 to the second chamber 2. Using a smaller diameter will increase the volume of the first chamber 1, and decrease the volume of the second chamber 2. This will make it take longer to heat the first chamber 1 water to boiling. This gives the second chamber 2 water more time to get warmer, plus the eventual mixing of the extra first chamber 1 water will result is a higher average output temperature. Conversely, using a larger diameter shield, hot/cold separator 8 will result in a lower average output temperature.

Changing the shield, hot/cold separator 8 effectiveness will change how much microwave energy reaches the water in the second chamber 2. A less effective shield, hot/cold separator 8 will result in a higher average output temperature. This can be accomplished with a material change, or with openings in the shield, hot/cold separator 8, or a thinner material.

Changing the top shield 27 effectiveness will change how much microwave energy reaches the water in the second chamber 2 and to some degree the first chamber 1. A less effective top shield 27 will result in a higher average output temperature. This can be accomplished with a material change, or with openings in the top shield 27, or a thinner material, or a smaller outer diameter.

Changing the bottom shield 29 effectiveness will change how much microwave energy reaches the water in the second chamber 2 and to some degree the first chamber 1. A less effective bottom shield 29 will result in a higher average output temperature. This can be accomplished with a material change, or with openings in the bottom shield, or a thinner material. A more effective shield can be made with a larger outer diameter, resulting in a lower output temperature.

Changing the cup shield 51 effectiveness will change how much microwave energy reaches the coffee in the cup 7. A less effective cup shield 51 will result in more heating of the coffee after it is in the cup 7. A taller cup shield 51 will be more effective, and a shorter cup shield 51 will be less effective.

Following are alternate embodiments of different sections of the invention. They are shown in FIGS. 8A and 8B together as alternate embodiment 37, but they can be used separately to replace their similar components in the preferred embodiment.

Figure 8A:
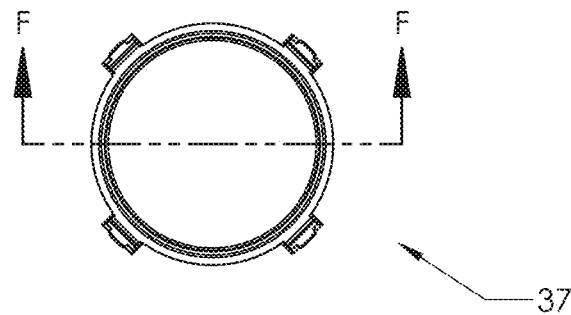
FIG. 8A is a top view of an alternate embodiment of a device for delivering liquid heated to a set temperature under pressure in a microwave oven, in a closed position.
Figure 8B:
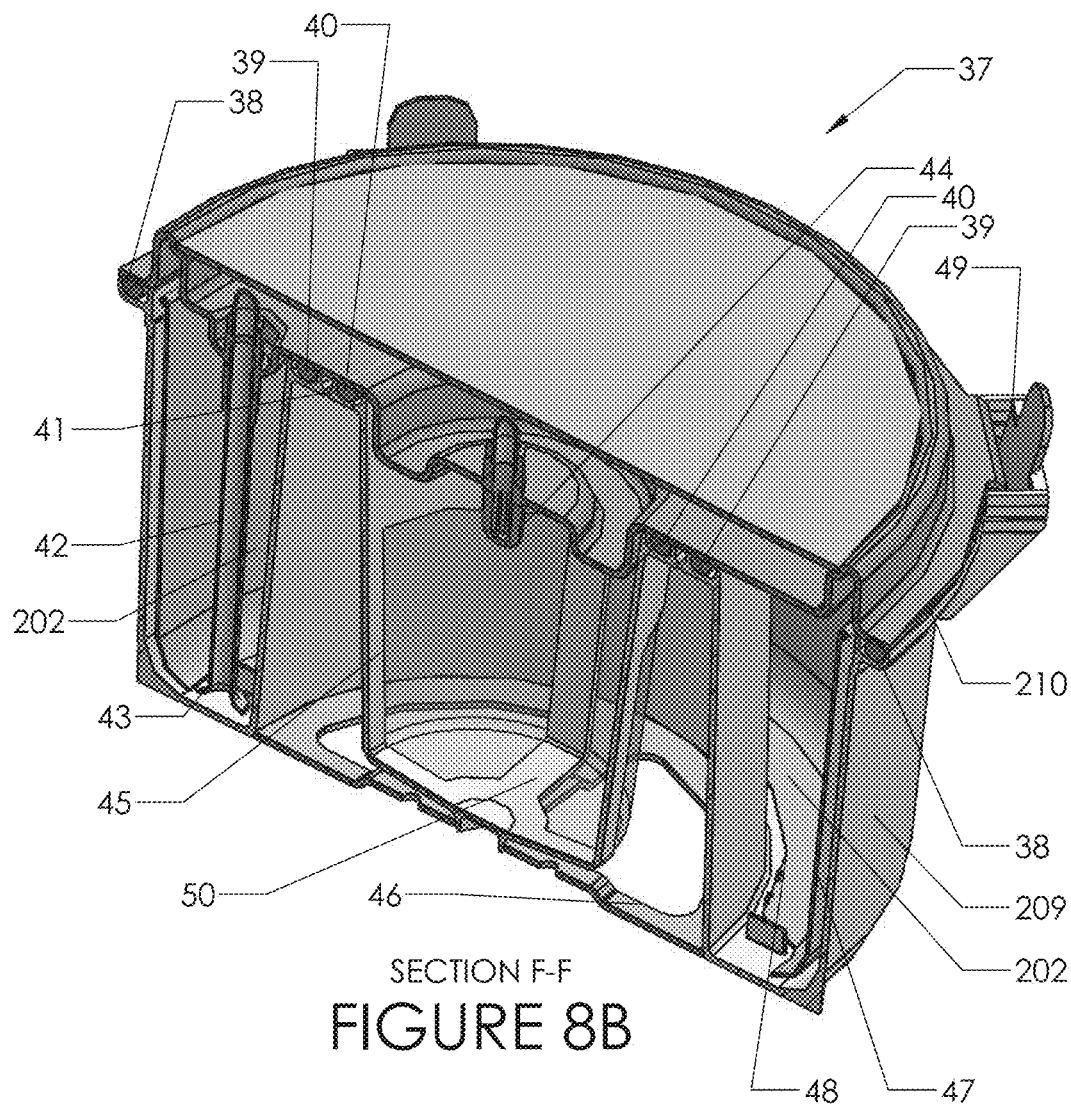
FIG. 8B is an isometric sectional view of the alternate embodiment of FIG. 8A, in a closed position.

An alternate embodiment shown in FIGS. 8A and 8B of the invention includes a built-in reusable pod 50 in place of the pod receiving chamber. This would enable the use of loose ground coffee. The design of reusable pods is well known in the industry. The built in reusable pod has screened walls/bottom 45. FIGS. 8A and 8B illustrate the main differences between the two embodiments described in this paragraph. An additional seal, pod section seal, axial 40, has been added to isolate the coffee ground section from the pressure vent holes 41. If no vent holes are used, or the vent holes are located under the inner seal, the added seal may be optional. A flow nozzle 44 is used in place of the liquid insertion needle 16 used in the preferred embodiment, as the lid of such reusable pods does not need to be pierced. There are more openings in bottom shield 46 for coffee or other product to exit into cup 7. Alternatively, a containment cup, not shown, could be around the built-in reusable pod 50 and direct flow to a specific opening.

In the alternate embodiment 37 shown in FIGS. 8A and 8B, the latch system 49 is located near the outer seal, axial 38 so that the vessel lid 210 is securely closed against the outer seal, axial 38 even under pressure. The inner seal, axial 39 is located a certain distance radially inward from the latches. As the vessel is made from a deformable material with known properties, the proper amount of pre-loading is designed into the vessel lid 210 and vessel body 209 so the inner seal, axial 39 has the necessary amount of compression to function as it is intended under normal anticipated pressures. In the alternate embodiment, if internal pressures exceed the normal operating level, the strength of the vessel lid 210 and vessel body 209 is controlled and intentionally kept flexible enough that the vessel lid 210 and vessel body 209 separate in the inner seal area (i.e., due to the upward flexing of the vessel lid 210 and downward flexing of the vessel body 209), breaking the seal and allowing excess pressure to escape. In the preferred alternate embodiment there are pressure vent holes 41 in the vessel body inside the radius of the inner seal and outside the radius of the pod section seal axial 40 to safely vent any escaping steam.

In the alternate embodiment shown in FIGS. 8A and 8B, the shield, hot/cold separator 8 has been replaced with a shield, hot/cold separator with bottom 47. This helps keep the water in second chamber 202 shielded from microwaves. Note a shield gap 48 between the inner edge of shield hot/cold separator with bottom 47 and the inner vertical wall of the second chamber 202 is needed to allow a liquid flow path.

Alternative embodiments of the invention may be used with infusible material cartridges that do not need to be pierced at or near the bottom for the brewed beverage to flow out of the cartridge (such cartridges may have a mesh bottom surface). In such alternative embodiments (not illustrated), the extraction needle may be omitted.

Advantageously, devices and methods of embodiments of the invention enable a user to make a brewed beverage using a single serve beverage cartridge anywhere there is a microwave oven. All of the energy needed to make a brewed beverage is provided by the microwave. As such, devices of embodiments of the invention do not have their own heating element or power supply. The device is lightweight and compact, and therefore easy to transport during travel. The device is simple and durable, with no electrical or electronic components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A device for delivering a liquid heated to a desired temperature under pressure in a microwave oven, the device comprising:
    a first chamber adapted to receive and hold a first volume of a liquid, wherein the first chamber is configured such that the liquid in the first chamber receives a first amount of microwave energy produced by a microwave oven during a period of time;
    a second chamber adapted to receive and hold a second volume of the liquid, wherein the second chamber is configured such that the liquid in the second chamber receives a second amount of microwave energy produced by a microwave oven during the period of time, wherein a ratio of the second amount of microwave energy to a mass of the second volume of liquid is less than a ratio of the first amount of microwave energy to a mass of the first volume of liquid;
    a vapor flow path from the first chamber to the second chamber; and
    a liquid/vapor flow path from the second chamber to a destination outside of the second chamber;
    wherein, when the liquid in the first chamber reaches its boiling point from receiving the first amount of microwave energy and at least partially turns into a gas, at least a portion of the gas flows through the vapor flow path from the first chamber into the second chamber, thereby increasing a pressure in the second chamber; and
    wherein the increased pressure in the second chamber forces at least a portion of the liquid in the second chamber through the liquid/vapor flow path from the second chamber to the destination outside of the second chamber.

2. The device of claim 1, wherein a first chamber end of the vapor flow path is above a predetermined liquid fill line.

3. The device of claim 2, wherein a second chamber end of the liquid/vapor flow path is below the predetermined liquid fill line.

4. The device of claim 3, wherein the second chamber end of the liquid/vapor flow path is in a bottom one-fourth of the second chamber.

5. The device of claim 1, further comprising a liquid flow path between the first and second chambers such that the liquid is able to flow between the first and second chambers.

6. The device of claim 1, wherein the first and second chambers are formed from a larger chamber with a dividing wall separating the larger chamber into the first and second chambers.

7. The device of claim 6, wherein the dividing wall is arranged such that the first chamber peripherally surrounds the second chamber.

8. The device of claim 1, further comprising a nucleation site on an internal surface of the first chamber.

9. The device of claim 1, further comprising a chamber adapted to receive and hold an infusible material; and
wherein the liquid/vapor flow path delivers the liquid to the infusible material chamber.

10. The device of claim 1, further comprising a chamber adapted to receive and hold a cartridge containing an infusible material;
wherein the liquid/vapor flow path delivers the liquid to the infusible material cartridge chamber.

11. The device of claim 10, further comprising a liquid insertion needle at a distal end of the liquid/vapor flow path, wherein the liquid insertion needle is adapted to pierce a lid of the cartridge such that the liquid is delivered into the cartridge.

12. The device of claim 11, wherein the infusible material chamber comprises an extraction needle adapted to pierce a bottom surface and/or a side surface of the cartridge such that the liquid delivered into the cartridge flows out of the cartridge through the extraction needle as a brewed beverage.

13. The device of claim 1, wherein the device does not comprise an electric heating element.

14. A device for brewing a beverage in a microwave oven, the device comprising:
a first chamber adapted to receive and hold a first volume of a liquid, wherein the first chamber is configured such that the liquid in the first chamber receives a first amount of microwave energy produced by a microwave oven during a period of time;
a second chamber adapted to receive and hold a second volume of the liquid, wherein the second chamber is configured such that the liquid in the second chamber receives a second amount of microwave energy produced by a microwave oven during the period of time, wherein a ratio of the second amount of microwave energy to a mass of the second volume of liquid is less than a ratio of the first amount of microwave energy to a mass of the first volume of liquid;
a vapor flow path from the first chamber to the second chamber;
a chamber adapted to receive and hold a cartridge containing an infusible material; and
a liquid/vapor flow path from the second chamber to the infusible material chamber, wherein the liquid/vapor flow path has a liquid insertion nozzle at its distal end;
wherein, when the liquid in the first chamber reaches its boiling point from receiving the first amount of microwave energy and at least partially turns into a gas, at least a portion of the gas flows through the vapor flow path from the first chamber into the second chamber, thereby increasing a pressure in the second chamber;
wherein the increased pressure in the second chamber forces at least a portion of the liquid in the second chamber through the liquid/vapor flow path and the liquid insertion nozzle and into the cartridge; and
wherein the liquid delivered into the cartridge flows through the infusible material and out of the cartridge as a brewed beverage.

15. The device of claim 14, wherein a first chamber end of the vapor flow path is above a predetermined liquid fill line.

16. The device of claim 15, wherein a second chamber end of the liquid/vapor flow path is below the predetermined liquid fill line.

17. The device of claim 16, wherein the second chamber end of the liquid/vapor flow path is in a bottom one-fourth of the second chamber.

18. The device of claim 14, further comprising a liquid flow path between the first and second chambers such that the liquid is able to flow between the first and second chambers.

19. The device of claim 14, wherein the first and second chambers are formed from a larger chamber with a dividing wall separating the larger chamber into the first and second chambers.

20. The device of claim 19, wherein the dividing wall is arranged such that the first chamber peripherally surrounds the second chamber.

21. The device of claim 14, further comprising a nucleation site on an internal surface of the first chamber.

22. The device of claim 14, wherein the infusible material chamber comprises an extraction needle adapted to pierce a bottom surface and/or a side surface of the cartridge; and
wherein the liquid flows out of the cartridge through the extraction needle.

23. The device of claim 14, wherein the liquid insertion nozzle comprises a liquid insertion needle adapted to pierce a lid of the cartridge.

24. The device of claim 14, wherein the device does not comprise an electric heating element.

* * * * *